United States Patent [19]
Young

[11] Patent Number: 5,938,747
[45] Date of Patent: Aug. 17, 1999

[54] HARDWARE COMMAND BLOCK DELIVERY QUEUE FOR HOST ADAPTERS AND OTHER DEVICES WITH ONBOARD PROCESSORS

[75] Inventor: B. Arlen Young, Palo Alto, Calif.

[73] Assignee: Adapter, Inc., Milpitas, Calif.

[21] Appl. No.: 08/816,980

[22] Filed: Mar. 13, 1997

[51] Int. Cl.[6] .............................................. G06F 15/167
[52] U.S. Cl. .................... 710/53; 710/5; 710/21; 710/52
[58] Field of Search ................... 711/200; 395/200.3, 395/200.43; 709/200, 213; 710/5, 21, 52, 53

[56] References Cited

U.S. PATENT DOCUMENTS

| | | | |
|---|---|---|---|
| 4,543,626 | 9/1985 | Bean et al. ............................. | 364/200 |
| 4,601,586 | 7/1986 | Bahr et al. ........................ | 395/200.36 |
| 4,615,001 | 9/1986 | Hudgins .................................. | 395/672 |
| 4,682,284 | 7/1987 | Schrofer ................................. | 395/875 |
| 4,930,069 | 5/1990 | Batra et al. ........................ | 395/200.42 |
| 4,939,644 | 7/1990 | Harrington et al. .................... | 395/825 |
| 4,975,829 | 12/1990 | Clarey et al. ........................... | 395/500 |
| 4,980,852 | 12/1990 | Giroir ................................. | 395/200.43 |
| 5,239,634 | 8/1993 | Buch ....................................... | 711/200 |
| 5,418,913 | 5/1995 | Fujimoto ............................ | 395/200.43 |
| 5,459,839 | 10/1995 | Swarts et al. ........................... | 395/292 |
| 5,548,728 | 8/1996 | Danknick ............................ | 395/200.43 |
| 5,548,795 | 8/1996 | Au ............................................ | 395/872 |
| 5,562,913 | 10/1996 | Crick et al. ............................. | 395/856 |
| 5,581,705 | 12/1996 | Passint et al. ....................... | 395/200.3 |
| 5,606,679 | 2/1997 | Cohn et al. ................................ | 711/4 |
| 5,619,685 | 4/1997 | Schiavone ............................... | 395/500 |
| 5,680,303 | 10/1997 | Libucha et al. ......................... | 364/138 |
| 5,729,681 | 3/1998 | Aditya et al. ....................... | 392/200.1 |
| 5,745,785 | 4/1998 | Shoji et al. ............................. | 395/827 |
| 5,781,199 | 7/1998 | Oniki et al. ............................. | 345/505 |

*Primary Examiner*—Thomas C. Lee
*Assistant Examiner*—Chien Yuan
*Attorney, Agent, or Firm*—Forrest Gunnison

[57] ABSTRACT

A method for queuing hardware control blocks, such as SCBs, for a system including a system processor coupled to a plurality of host adapter devices and a buffer memory controller device by an I/O bus is based on use of an endless new hardware command block queue, and an endless done hardware command block queue. The hardware command blocks for a plurality of devices, where each device includes a device processor, are managed by forming an endless queue for a device in a memory external to the device. A first pointer to the endless queue is maintained in a memory that is not within the memory space of the device processor. A second pointer to the endless queue is maintained in a memory addressable by the device processor. The first and second pointers address the head and tail hardware command block array sites of the endless queue.

31 Claims, 16 Drawing Sheets

HARDWARE COMMAND BLOCK DELIVERY QUEUE FOR HOST ADAPTERS AND OTHER DEVICES WITH ONBOARD PROCESSORS

BACKGROUND OF THE INVENTION

1. Field of the Invention

The present invention is related generally to communications with host adapter integrated circuits, and in particular to methods of queuing hardware command blocks that are used in communicating tasks to one or more host adapter integrated circuits, or other devices.

2. Description of Related Art

Hardware control blocks, sometimes called sequencer control blocks or SCSI control blocks (SCBs), are typically used for transferring information between a software host adapter device driver in a host computer and a host adapter integrated circuit that controls operations of one or more peripheral devices. Methods for queuing SCBs are known to those of skill in the art. For example, see copending and commonly assigned U.S. patent application Ser. No. 07/964,532 entitled "Intelligent SCSI Bus Host Adapter Integrated Circuit," of Craig A. Stuber et al. filed on Oct. 16, 1992, which is incorporated wherein by reference in its entirety. See also copending and commonly assigned U.S. patent application Ser. No. 08/269,491 entitled "A Sequencer Control Block Array External To A Host Adapter Integrated Circuit" of B. Arlen Young, et al. filed on Jun. 30, 1994, and also U.S. Pat. No. 5,564,023 entitled "Method for Accessing A Sequencer Control Block By A Host Adapter Integrated Circuit" of B. Arlen Young issued on Oct. 8, 1996, each of which is incorporated herein by reference in its entirety.

Typically, the software host adapter device driver, that transmits SCBs to the host adapter integrated circuit, included an operating system specific module (OSM) and a hardware interface module (HIM) that both were maintained in the host computer system. The OSM knew nothing about the hardware in the host adapter integrated circuit and communicated with both the host computer operating system and the HIM. The HIM communicated only with the host adapter integrated circuit and the OSM. The OSM provided information for use in a SCB and sent that information to the HIM, which in turn built a SCB. Alternative methods for queuing the SCBs by the HIM and the host adapter integrated circuit are described in the patents referenced above and so are not repeated herein.

In another application illustrated in FIG. 1, a secondary microprocessor 105, e.g., an Intel i960 microprocessor receives a command for a virtual disk drive, e.g., a read command, or a write command to a RAID system, from a host computer(not shown) over host computer bus 115. Similar to the operations described above, in response to the virtual disk drive command, an OSM 101, that is executing on secondary microprocessor 105, sends information necessary to implement the virtual disk drive command to a HIM 102, that also executes on secondary microprocessor 105, and in turn transfers control to HIM 102. HIM 102 includes the information received from OSM 101 in a SCB or SCBs, that are built by HIM 102, to implement the virtual disk drive command.

HIM 102 manages a plurality of host adapter devices 120, 130, and a buffer memory controller device 140 that are on a secondary PCI bus 111, and configures each SCB for execution by a particular one of these devices. Secondary PCI bus 111 is coupled to secondary microprocessor 105 by a local bus to PCI bus interface circuit 110.

Buffer memory controller device 140 is, for example, an Adaptec AIC 7810 host adapter integrated circuit while host adapter devices 120 and 130 are each an Adaptec AIC-7880 host adapter integrated circuit. Each of host adapter integrated circuits 120, 130, and buffer memory controller device 140 includes an on-board processor, i.e., sequencers 125, 135 and 145, respectively, and scratch memory.

Communication between HIM 102 and host adapter integrated circuits 120, 130, and buffer memory controller device 140 is accomplished using an external memory bus 112 and random access memory 150. Specifically, HIM 102 reads and writes SCBs to a SCB array 155 in random access memory 150 via an external bus port 116 that is connected to random access memory 150 by external memory bus 112. Random access memory 150 is within the address spaces of devices 120, 130, 140, that are each connected to random access memory 150 via external memory bus 112.

Task requests from HIM 102 to host adapter devices 120, 130, and buffer memory controller device 140 are made via the SCBs. In this embodiment, HIM 102 writes the SCBs to one of 256 sites of SCB array 155 (FIG. 2) in RAM 150. The size of each site is 32 bytes. Each SCB written to a site in RAM 150 is executed by a sequencer in one of devices 120, 130, and 140. Similarly, when execution of the SCB is completed, HIM 102 receives the completed SCB from the site in RAM 150.

To manage the SCBs, a new SCB queue is maintained within SCB array 155 for each of devices 120, 130, and 140. Devices 120, 130, and 140 share a done SCB queue. Each SCB queue is a linked list of SCBs and has head and tail pointers that delimit the queue. The head and tail pointers are stored in SCB array site 255 (FIG. 2).

Both HIM 102 and the sequencer in the device can access SCBs in the new SCB queue for that device as well as the head and tail pointers in SCB site 255 for the queue. Thus, each SCB queue has two delimiters that are accessible by both a device driver and one of a plurality of devices.

When a SCB is placed in a queue, either the new SCB queue or the done SCB queue, the SCB is linked to the SCB at the end of the queue, using the tail pointer to identify the tail SCB. After appending the SCB to the SCB queue, the tail pointer in SCB site 255 is updated to point to the new end of the queue. If the queue was empty, there is no queued SCB to which to append the SCB. In this instance, the queue head pointer in SCB site 255 also must be updated to point to the SCB. These operations are performed by the party, either HIM 102 or the device sequencer, placing the SCB in the queue.

To remove a SCB from a queue, the queue head pointer is used to identify the first SCB in the queue. SCBs can be removed from any site in the queue, including the sites addressed by the head and tail pointers, i.e., the head SCB and the tail SCB, respectively. If the head SCB is removed, the head pointer must be updated. If the tail SCB is removed, the tail pointer must be updated. If a SCB at a position other than the head is removed, the pointer to the next SCB in the queue is relocated from the removed SCB to the SCB preceding the removed SCB in the queue.

FIG. 3 illustrates a new SCB queue 355 for host adapter device 130 within SCB array 155 that contains three SCBs 301 to 303. SCB 301 is stored in SCB site 5, SCB 302 in SCB site 37 and SCB 303 in SCB site 102.

Each of SCBs 301 to 303 includes a field Q_NEXT. Field Q_NEXT contains either a SCB site pointer with a pointer value that points to the next SCB site in new SCB queue 355, or a pointer value that indicates the end of new SCB queue 355.

Specifically, SCB 301 is linked to SCB 302 by a SCB site pointer having a value of 37 stored in field Q_NEXT, and SCB 302 is linked to SCB 303 by a SCB site pointer having a value of 102 stored in field Q_NEXT. The pointer in field Q_NEXT of SCB 303 at the tail of new SCB queue 355 has a predefined value, e.g., the null value of 255, indicating that SCB 303 is the last SCB in new SCB queue 355.

Since SCB site pointer value 255 has been assigned as the null or invalid value, no SCB is ever loaded by HIM 102 into SCB array site 255 (FIG. 2). Therefore, this site is available for uses other than storing SCBs. In this embodiment, SCB array site 255 is used for saving queue head and tail pointers for the new SCB and done SCB queues, since array site 255 is accessible by both HIM 102 and all of sequencers 125, 135, and 145 in host adapter devices 120, 130, and buffer memory controller device 140, respectively. For example, head pointer 310 points to head SCB site 5 and tail pointer 311 points to tail SCB site 102.

HIM 102 might build new SCB queue 355 in the following matter. Initially, new SCB queue 355 is empty. This is reflected by head and tail pointer values of 255 (Not shown). HIM 102 builds SCB 301 to be executed by host adapter device 130 in response to information from OSM 101, and allocates SCB array site 5 in memory 150 for SCB 301. HIM 102 loads array site 5 with SCB 301, and loads head and tail pointers 310 and 311 with the value five to indicate that new SCB queue 305 contains a single SCB 301.

Later, HIM 101 builds two more SCBs 302 and 303 to be executed. HIM 101 allocates array sites 37 and 102 for these SCBs, and loads SCBs 302 and 303 into these sites. SCB 302 is linked to SCB 303 by loading 102 into field Q_NEXT of SCB 302. Since SCB 303 will become the tail SCB of new SCB queue, HIM loads 255 into field Q_NEXT of SCB 303. HIM appends two new SCBs 302 and 303 to new SCB queue 355 by loading thirty-seven into field Q_NEXT of SCB 301. Finally, HIM 102 updates tail pointer 311 in SCB array site 255 to point to SCB site 102. Head pointer 310 is not updated, because new SCB queue 355 was not empty when two new SCBs 302 and 303 were queued. While this example considers new SCB queue 355, the construction of done SCB queue is similar except the operations described are performed by the device sequencer.

While HIM 102 is appending SCBs to new SCB queue 355, sequencer 135 can be removing SCBs from new SCB queue 355. Sequencer 135 scans new SCB queue 355 from head SCB 301 to tail SCB 303, looking for a SCB that is eligible for execution. Execution can be delayed because, for example, a device targeted by the SCB is already busy.

Specifically, sequencer 135 determines that new SCB queue 355 is not empty by checking head pointer 310 in SCB array site 255, and finding that head pointer 310 is not set to 255. Sequencer 135 uses head pointer 310 to locate head SCB 301 in new SCB queue 355.

If sequencer 135 finds that head SCB 301 cannot yet be executed, sequencer 135 reads the SCB site pointer in field Q_NEXT of SCB 301 to locate the storage site of next SCB 302 in new SCB queue 355. If sequencer 135 finds that execution can begin for SCB 302, sequencer 135 removes SCB 302 from new SCB queue 355. Removal of SCB 302 is accomplished by moving the value of the SCB site pointer in field Q_NEXT of SCB 302 to field Q_NEXT of previous SCB 301. Thus, the value 102 is moved from field Q_NEXT of SCB 302 at SCB array site 37 to field Q_NEXT of SCB 301 at SCB array site 5. Neither head pointer 310 nor tail pointer 311 is changed by sequencer 135, because SCB 302 was neither at the head nor the tail of new SCB queue 355.

Later, when sequencer 135 is looking for another SCB to begin executing, sequencer 135 scans new SCB queue 355 again. If, for example, sequencer 135 finds that SCB 301 still cannot be started, sequencer 135 checks SCB 303. If SCB 303 can be started, sequencer 135 removes SCB 303 from new SCB queue 355. Since the SCB site pointer in field Q_NEXT of SCB 303 has a value of 255, sequencer 135 recognizes that SCB 303 is at the tail of new SCB queue 355. Upon removing SCB 303 from new SCB queue 355, the new queue tail becomes SCB 301. Sequencer 135 moves the value of the SCB site pointer in field Q_NEXT in SCB 303 to field Q_NEXT in SCB 301, and loads SCB array site 5 into the tail pointer 311 at SCB site 255. Head pointer 310 is not changed.

Eventually, SCB 301 becomes eligible for execution, and sequencer 135 removes SCB 301 from new SCB queue 355. Since SCB 301 is at the head of new SCB queue 355, sequencer 135 moves the value of the SCB site pointer in field Q_NEXT into head pointer 310 in SCB site 255. The value of the SCB site pointer is 255, in this example, and so sequencer 135 has also indicated that new SCB queue 355 for host adapter device 120 is now empty.

As described above, appending a SCB to a queue requires multiple operations, as does removing a SCB. By necessity, these operations are separated in time. Because a queue is commonly accessible by both HIM 102 and a sequencer, i.e., by two parties, there can be accesses by one party in between operations of the other party. Problems arise when a queue is accessed by one party while that queue is in the midst of being changed by the other party. For example, sequencer 135 has just removed tail SCB 303 from new SCB queue 355, but has not yet updated tail pointer 311. HIM 102 uses the old value of tail pointer 311 to append a new SCB to new SCB queue 355. The result is that the new SCB is appended to a SCB site that is no longer in new SCB queue 355. Consequently, the appended SCB will never be received by sequencer 135. To eliminate problems such as this, different orders of operations by one party can be tried, but all have their vulnerability to disastrous accesses by the other party.

To prevent errors in management of the queues, both the new SCB queues and the done SCB queue, a token scheme is used to lock one party out of a queue while the other party is modifying the queue. A token, a bit in a register, is commonly accessible by HIM 102 and the sequencer or sequencers that have access to the queue. The token can be taken by one party or the other, but not both. A party must have possession of the token before that party can modify a queue, and must return the token when the party is done operating on the queue.

This scheme insures that one party cannot draw false conclusions about the state of a queue while that queue is being changed by another party. Normally, each queue has a corresponding token register dedicated to that queue. Thus, new SCB queue 355 has a token register within SCB array site 255.

Hence, SCB array site 255 contains head and tail pointers and token registers for new SCB and done SCB queues. For four host adapter devices, each with a new SCB queue and token register, and a shared done SCB queue and token register, the number of queue delimiter and token bytes at SCB site 255 is fifteen.

While this method of SCB management is reliable, the maintenance of the head and tail pointers, and the tokens results in complex queue management. This queue management requires both time for processing and valuable real estate associated with the firmware required for both the HIM and the operations performed by the sequencers. Since the operations being performed are typically associated with managing user data, a SCB queue management method that requires less complexity, is reliable, and reduces processing time is desirable.

SUMMARY OF THE INVENTION

In accordance with the principles of this invention, a method for queuing hardware control blocks, such as SCBs, for a system including a system processor coupled to a plurality of host adapter devices and a buffer memory controller device by an I/O bus is based on use of an endless new hardware command block queue, and an endless done hardware command block queue. According to the principles of this invention, the hardware command blocks for a plurality of devices, where each device includes a device processor, are managed by forming an endless queue for a device in a memory external to the device. A first pointer to the endless queue is maintained in a memory that is not within the memory space of the device processor. A second pointer to the endless queue is maintained in a memory addressable by the device processor. In one embodiment, the first and second pointers address the head and tail hardware command block array sites of the endless queue.

In view of the storage locations of the pointers, only a process executing on the system processor can update the first pointer, and only a process executing on the device processor can update the second pointer. Each hardware command block storage site includes a next queue site field that can be read by both of these processes, but only the process appending a hardware command block site to the endless queue can modify the next queue site field.

Hence, according to the principles of this invention, all of the endless hardware command block queue delimiters are not maintained and defined for both a device driver that executes on the system processor, and processes that execute on the device processors of the devices coupled to the system processor by the I/O bus. Consequently, the management of the endless hardware control block queues of this invention is far less complex than the management of the prior art new and done SCB queues. In addition, elimination of the need to store queue delimiters in a shared memory accessible by both the device driver and the devices eliminates time delays associated with contention among the device driver and processes executing on the devices in accessing a shared memory.

The endless hardware command block queues of this invention are managed such that the queues never are empty. Further, the endless queues of this invention eliminate the prior art queue locking requirements and so eliminate the need for storing and accessing tokens in a memory common to a device driver and the devices on the I/O bus. The elimination of the tokens removes a bottleneck. Neither the device driver nor the device processors, sometimes referred to as device sequencers, need to wait for a token to be returned prior to accessing or appending a hardware control block to an endless queue. Consequently, delays in the processing of hardware control blocks have been eliminated for both.

Hence, according to the principles of this invention, a method for management of hardware command blocks, in a system having a system processor coupled to a plurality of devices by a bus, includes addressing a head hardware command block storage site of an endless hardware command block queue using a head hardware command block pointer. The head hardware command block pointer is changed only by a first party. A tail hardware command block storage site of the endless hardware command block queue is addressed using a tail hardware command block pointer. The tail hardware command block pointer is changed only by a second party different from the first party.

The first party is one of (i) a process executing on a device processor of one device in the plurality of devices and (ii) a device driver executing on the system processor. The second party is the other of the process executing on said device processor and said device driver.

In one embodiment, the endless hardware command block queue of this invention is an endless new hardware command block queue. In this embodiment, the first party is the process executing on the device processor of one device in the plurality of devices and the second party is the device driver.

The management method includes scanning the endless new hardware command block queue by the process executing on the device processor of one device in the plurality of devices to determine whether the endless new hardware command block contains a hardware command block that can be executed.

When the scan detects a hardware control block that can be executed, the head hardware command block pointer is unchanged by the process executing on the device processor of one device, when the hardware command block that can be executed is stored in a hardware command block storage site other than the hardware command block storage site addressed, e.g., pointed to, by the head hardware command block pointer. In this case, the executable hardware control block is removed from the endless new hardware control block queue for execution, and the endless new hardware command block queue is mended.

When the scan detects a hardware control block that can be executed, and that is stored in a hardware command block storage site addressed, e.g., pointed to, by the head hardware command block pointer, the executable hardware command block is removed from the endless new hardware command block queue. The head hardware command block pointer is updated by the process executing on the device processor of one device when (i) the endless new hardware command block queue contains a hardware command block that can be executed, and (ii) the hardware command block that can be executed is stored in a hardware command block storage site pointed to by the head hardware command block pointer.

The device driver initializes the endless new hardware command block queue by:

loading a head hardware command block pointer in a memory addressable by the device processor with a pointer to an initial hardware command block storage site in the endless new hardware command block queue;

loading a tail hardware command block pointer in a memory of the system processor with a pointer to the initial hardware command block storage site in the endless new hardware command block queue; and setting a next queue site field in an initial hardware command block storage site to an invalid pointer.

A new hardware command block is loaded by the device driver in a tail hardware command block storage site of the endless new hardware command block queue without changing a next queue site field of the tail hardware command block storage site. The device driver allocates a new hardware command block storage site for the endless new hardware command block queue, and sets a next queue site field, in the new hardware command block storage site for the endless new hardware command block queue, to an invalid pointer. Next, the device driver sets the next queue site field of the tail hardware command block storage site to point to the new hardware command block storage site. Finally the device driver updates the tail hardware command block pointer to point to the new hardware command block storage site so that the new hardware command block storage site becomes the tail hardware command block storage site of the endless new hardware command block queue.

In another embodiment, the endless hardware command block queue is an endless done hardware command block queue. In this embodiment, the first party is the device driver, and the second party is the process executing on the device processor of one device in the plurality of devices.

In this embodiment, the device driver reads a next site queue field in the hardware command block storage site addressed by the head hardware command block pointer to determine whether the next site queue field contains a valid pointer. Upon determining that the next site queue field contains a valid pointer, the device driver copies the value in the next site queue field to the head hardware command block pointer.

Next, the device driver deallocates the hardware command block storage site previously addressed by the head hardware command block pointer, and posts the hardware command block in the hardware command block storage site pointed to by the value in the next site queue field as completed.

The device driver initializes the endless done hardware command block queue by:

loading a head hardware command block pointer in a memory of the system processor with a pointer to an initial hardware command block storage site in the endless done hardware command block queue;

loading a tail hardware command block pointer in a memory addressable by the device processor with a pointer to an initial hardware command block storage site in the endless hardware command block queue; and setting a next queue site field in an initial hardware command block storage site to an invalid pointer.

To append a completed hardware command block to the endless done hardware command block queue, the process executing on the device processor sets a next queue site field in the newly complete hardware command block to an invalid pointer value. The process executing on the device processor then reads and saves the tail hardware command block site pointer for the endless done hardware command block queue.

After the process executing on the device processor identifies the current tail hardware control block storage site, the process updates the tail hardware command block site pointer to address the newly completed hardware command block. Finally, the process executing on the device processor sets the next queue site field of the previous tail hardware command block storage site to address the new tail hardware command block storage site.

The methods of this invention are particularly useful for systems that have a connection, such as an external memory, between the system microprocessor and the devices on an I/O bus for delivering hardware command blocks, that is independent of the I/O bus. Frequent polling of the endless queue tail hardware control block array site by a device processor for a new hardware command block via an independent delivery connection removes traffic from the I/O bus and so enhances data transfer rates over the I/O bus. This method is also particularly well-suited for a system that has no convenient means, other than the endless hardware control block queue, for the device driver to notify a device processor that the endless hardware control block queue contains a new hardware control block.

DETAILED DESCRIPTION

Figure 1:
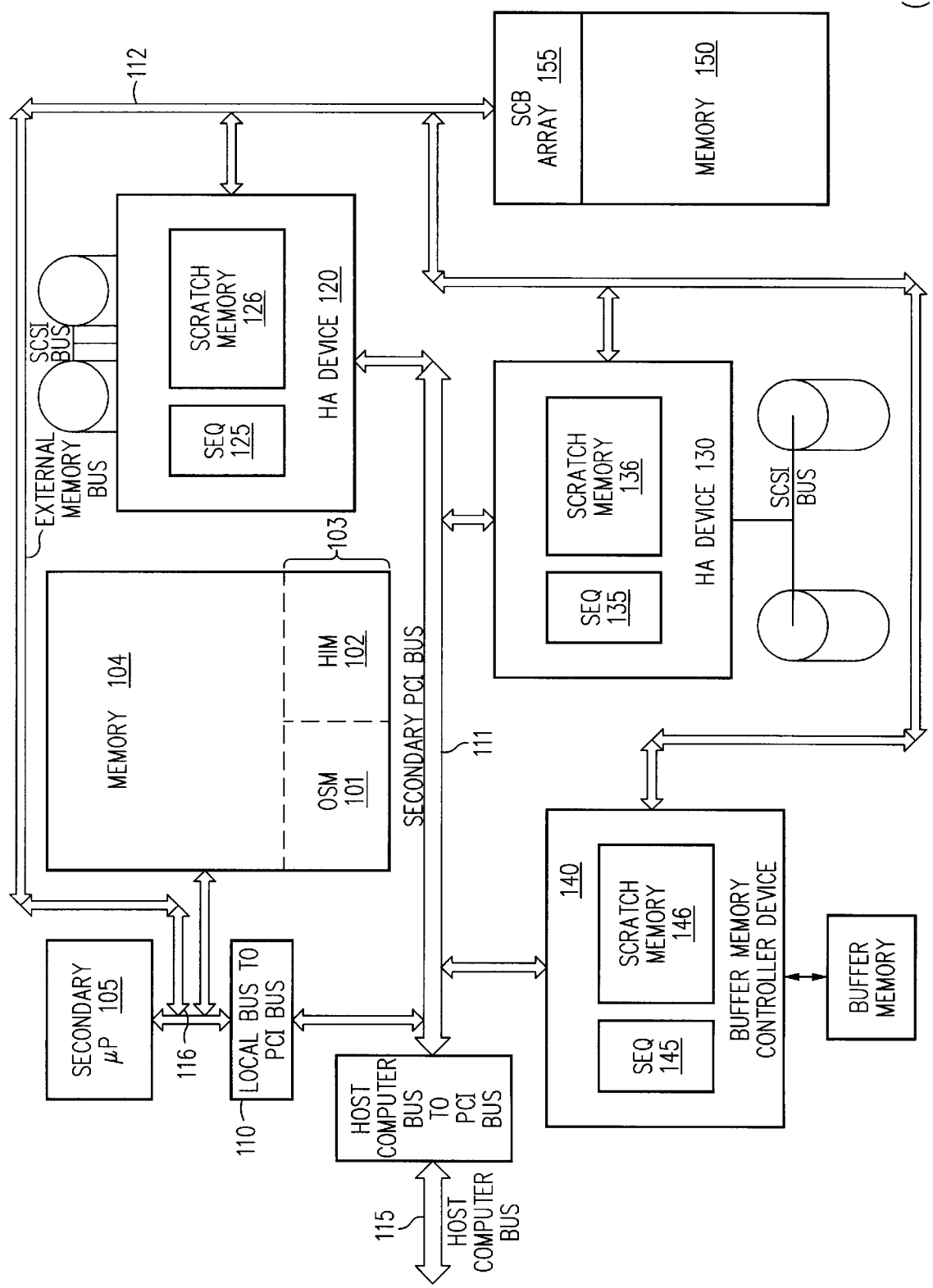
FIG. 1 is a block diagram of a prior art system that included an SCB array in an external memory.
Figure 2:
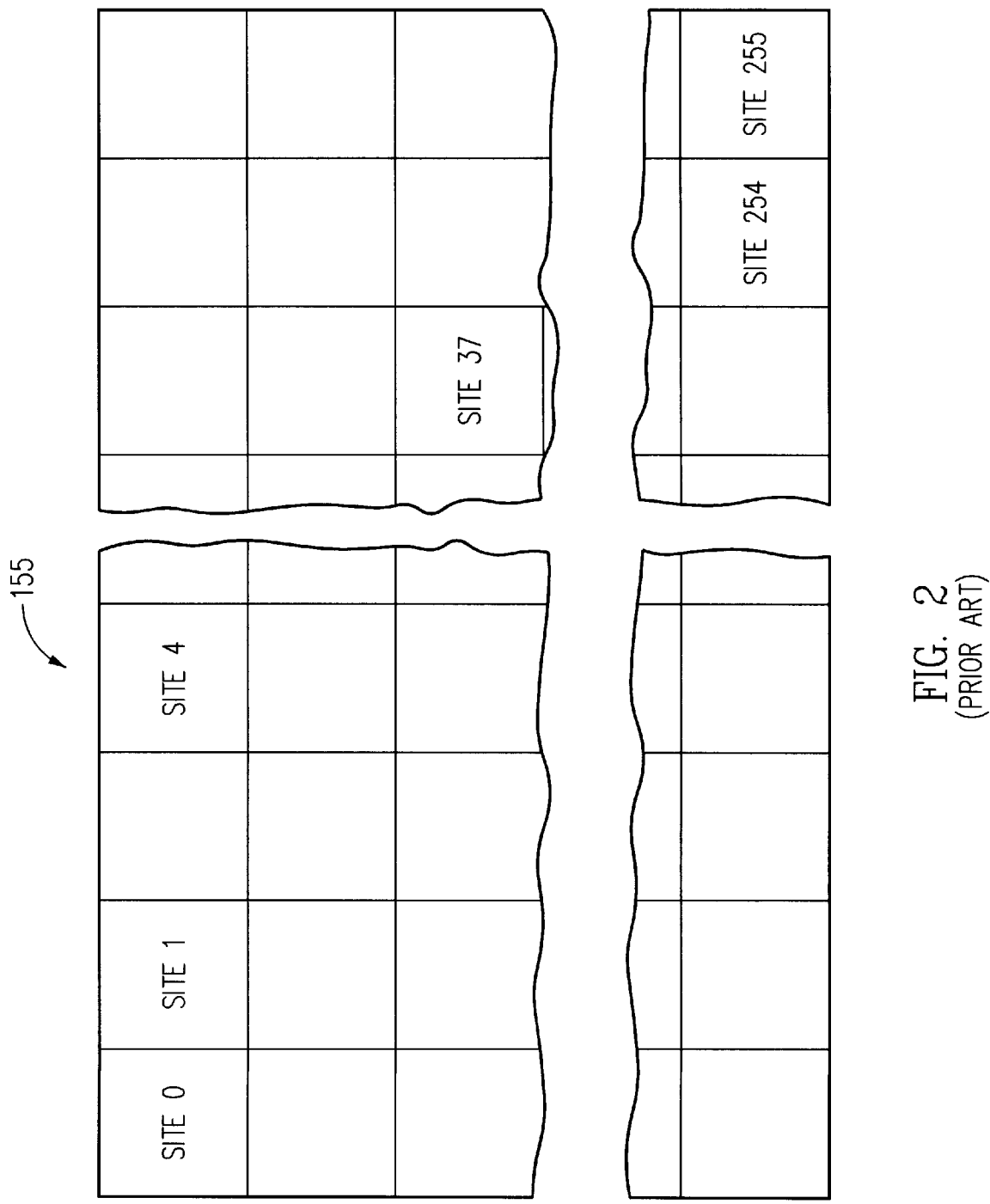
FIG. 2 is a more detailed diagram of the SCB array of FIG. 2.
Figure 3:
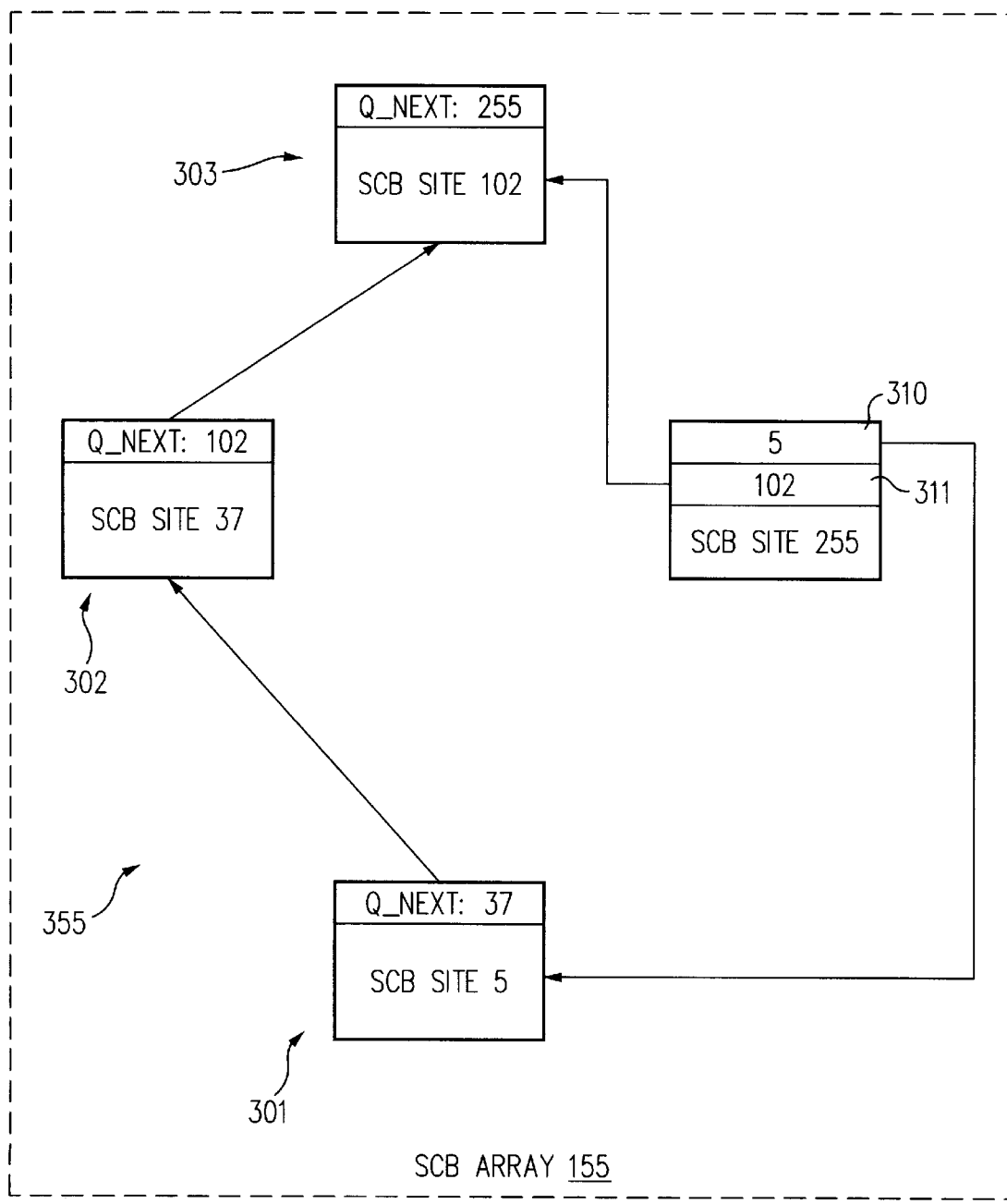
FIG. 3 is a diagram illustrating the pointers and links utilized in management of a SCB queue in the prior art SCB array.

In accordance with the principles of this invention, a method for queuing SCBs for a system 400 including a processor, e.g., secondary microprocessor 405, and a plurality of host adapter devices 420, 430, and a buffer memory controller device 440, that each include a sequencer 425, 435, and 445, respectively, is based on an endless new SCB queue 460, 470, and 480, one for each device on secondary bus 411, and an endless done SCB queue 465, 475, and 485, one for each device on secondary bus 411. Endless queues 460, 470, 480 and 465, 475, 485, as explained more completely below, are managed such that the queues never are empty. Also, as explained more completely below, pointers to the head and tail SCB array sites of each endless queue are stored in separate memories and each pointer can be modified by only one party. This feature in combination with the endless queue simplifies queue management; eliminates prior art contentions for access to a memory; and enhances performance of system 400 relative to prior art system 100.

A device driver 403 executing on microprocessor 405 manages devices 420, 430, and 440 through SCBS, e.g., hardware control blocks, that are appended to endless new SCB queues 460 to 480 and removed from endless done SCB queue 465 to 485. The SCBs used in this invention are similar to those of the prior art and include a next queue site field Q_NEXT, sometimes referred to as field Q_NEXT, that is used to store a SCB site pointer that addresses a SCB storage site in the endless queue.

As explained more completely below, endless queues 460, 470, 480 and 465, 475, 485 of this invention eliminate the prior art queue locking requirements and so eliminate the need for storing and accessing tokens in a memory common to device driver 403 and devices 420, 430, and 440. The elimination of the tokens removes a bottleneck. Neither device driver 403 nor device sequencers 425, 435, 445 need to wait for a token to be returned prior to accessing or appending a SCB to an endless queue. Consequently, delays in execution of SCBs have been eliminated for both.

Also, unlike the prior art methods, all of the queue delimiters are not maintained and defined for both device driver 403 and each of individual devices 420, 430, and 440. Consequently, the management of endless queues 460, 470, 480 and 465, 475, 485 of this invention is far less complex than the management of the prior art new and done SCB queues. In addition, elimination of the need to store queue delimiters in a shared memory accessible by both device driver 403 and devices 420, 430, and 440 eliminates time delays associated with contention among device driver 403 and devices 420, 430, and 440 in accessing a shared memory.

In one embodiment, secondary microprocessor 405, e.g., an Intel i960 microprocessor, receives a command for a virtual disk drive, e.g., a read command, or a write command to a RAID system, from a host computer(not shown) over host computer bus 415. In response to the virtual disk drive command, an OSM 401 of device driver 403, that executes on secondary microprocessor 405, provides information to implement the command for the virtual disk drive to a HIM 402 of device driver 403, and in turn transfers control to a HIM 402.

HIM 402 also executes on secondary microprocessor 405. HIM 402 manages the plurality of host adapter devices 420, 430, and buffer memory controller device 440 that are on secondary PCI bus 411. Secondary PCI bus 411 is coupled to secondary microprocessor 405 by a local to PCI bus interface circuit 410. Secondary PCI bus 411 is an example of an I/O bus. The principles of this invention are independent of the particular type of I/O bus used to couple secondary microprocessor 405 and devices 420, 430, and 440.

Buffer memory controller device 440 is, for example, an Adaptec AIC 7810 host adapter integrated circuit while host adapter devices 420 and 430 are each an Adaptec AIC-7880 host adapter integrated circuit. Each of devices 420, 430, and 440 includes an on-board processor that is referred to as sequencer 425, 435, and 445, respectively. Devices 420, 430, and 440 are similar to devices 120, 130, and 140 respectively, with modifications made to the sequencer firmware in view of the following disclosure.

A random access memory 450 is coupled to secondary processor 405 and each of devices 420, 430, and 440 by an external memory bus 412. Random access memory 450 is within the address space of secondary microprocessor 405 and within the address spaces of each of devices 420, 430, 440.

Figure 4:
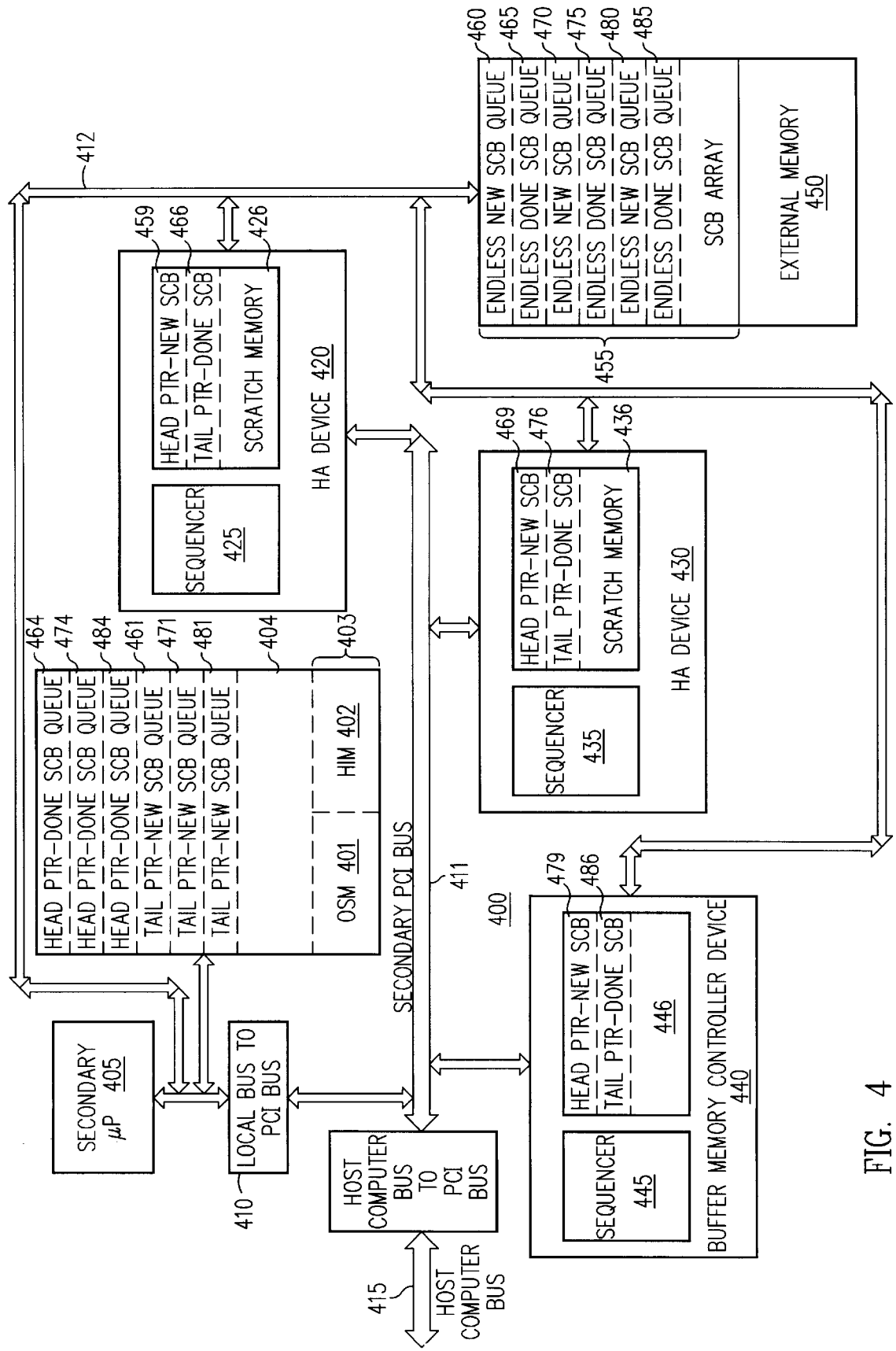
FIG. 4 is a block diagram of the system of this invention that includes a plurality of endless SCB queues within an SCB array in an external memory.

While in FIG. 4, memory 450 is shown as a single unit, this is for ease of illustration only, and is not intended to limit the invention to the specific configuration shown. The only restriction on memory 450 is that memory 450 is addressable by each of the devices and the microprocessor in system 400. Also, preferably, memory 450 is accessible by HIM 402 and devices 420, 430, and 440 by means other than secondary PCI bus 411.

According to the principles of this invention, each device 420, 430, and 440 has its own endless new SCB queue 460, 470, and 480, respectively, within SCB array 455. Each device 420, 430, and 440 also has its own endless done SCB queue 465, 475, and 485 within SCB array 455.

HIM 402 adds SCBs to endless new SCB queues 460, 470, and 480 and removes SCBs from endless done SCB queues 465, 475, and 485. Sequencers 425, 435, and 445 add SCBs to endless done SCB queues 465, 475, and 485, respectively, and remove SCBs from endless new SCB queues 460, 470, and 480, respectively. Specifically, each sequencer only removes new SCBs from its own endless new SCB queue and adds completed SCBs to its own endless done SCB queue.

Herein, when the description is applicable to both endless new SCB 460, 470, 480 and endless done SCB queues 465, 475, 485, the interaction with the queue is described as one party removing a SCB from a queue and the other party adding a SCB to the endless queue. The parties are easily identified for each type of queue in view of the description in the previous paragraph.

Each endless queue of this invention has head and tail pointers, but these pointers are not commonly accessible by both HIM 402 in device driver 403 and host adapter sequencers 425, 435, and 445. The head pointer is accessible by only the removing party, and the tail pointer is accessible by only the appending party.

Thus, HIM 402 reads and modifies only the tail new SCB site pointers for endless new SCB queues 460, 470, and 480, and the head done SCB site pointers for endless done SCB queues 465, 475, and 485. Each sequencer reads and modifies only the head new SCB site pointer for its endless new SCB queue and the tail done SCB site pointer for its endless done SCB queue. Therefore, one party, either HIM 402 or one of sequencers 425, 435, 445 cannot be reading a queue delimiter while the other party is modifying that delimiter.

In this embodiment, head and tail pointers are located in microprocessor memory, e.g., memory 404, and in sequencer scratch memory of a device. Thus, head done SCB site pointer 464 to the head done SCB storage site in endless done SCB queue 465; head done SCB site pointer 474 to the head done SCB storage site in endless done SCB queue 475; head done SCB site pointer 484 to the head done SCB storage site in endless done SCB queue 485; tail new SCB site pointer 461 to the tail new SCB storage site in endless new SCB queue 460; tail new SCB sit pointer 471 to the tail new SCB storage site in endless new SCB queue 470; and tail new SCB site pointer 481 to the tail new SCB storage site in endless new SCB queue 480 are stored in memory 404 that is addressable only by secondary microprocessor 405.

Endless new SCB queue 460 holds SCBs for execution by host adapter device 420. Thus, head new SCB site pointer 459 to the head new SCB storage site in endless new SCB queue 460 is stored in scratch memory 426 of sequencer 425. Endless done SCB queue 465 holds SCBs that have been executed by host adapter device 420. Thus, tail done SCB site pointer 466 to the tail done SCB storage site in endless done SCB queue 465 also is stored in scratch memory 426 of sequencer 425.

Endless new SCB queue 470 holds SCBs for execution by host adapter device 430. Head new SCB site pointer 469 to the head new SCB storage site in endless new SCB queue 470 is stored in scratch memory 436 of sequencer 435. Endless done SCB queue 475 holds SCBs that have been executed by host adapter device 430. Thus, tail done SCB site pointer 476 to the tail done SCB storage site in endless done SCB queue 475 also is stored in scratch memory 436 of sequencer 435.

Endless new SCB queue 480 holds SCBs for execution by host adapter device 440. Head new SCB site pointer 479 to the head new SCB storage site in endless new SCB queue 480 is stored in scratch memory 446 of sequencer 445.

Endless done SCB queue 485 holds SCBs that have been executed by host adapter device 440. Thus, tail done SCB site pointer 486 to the tail done SCB storage site in endless done SCB queue 485 also is stored in scratch memory 446 of sequencer 445.

As explained more completely below, in an initialization process, HIM 402 must have access to all of the head new SCB site pointers including those for endless new SCB queues 460, 470, 480 that are stored in scratch memories of the sequencers. After initialization, HIM 402 does not access the head new SCB site pointers for endless new SCB queues 460, 470, 480.

Similarly, in the initialization process, HIM 402 must have access to all of the tail done SCB site pointers including those for endless done SCB queues 465, 475, 485 that are stored in scratch memories of the sequencers. After initialization, HIM 402 does not access the tail done SCB site pointers for endless done SCB queues 465, 475, 485.

During normal operation, i.e., operation after initialization is completed, the only commonly accessible queue pointer, i.e., accessible by both HIM 402 and the plurality of sequencers 425, 435, and 445 is the SCB site pointer that forms a link between SCBs in an endless SCB queue. By reducing the number of commonly accessible pointers to one, intermediate states of a queue have been eliminated along with the need for a token locking scheme. With the endless queues of this invention, a SCB can be appended to the endless queue at any time independent of the removal of a SCB from the endless queue. Following initialization, an endless SCB queue is never empty. There is always at least one SCB storage site allocated to each endless SCB queue.

Each endless queue is a queue of SCB array sites. For illustration purposes only, each endless queue is shown in FIG. 4 as being a specific portion of SCB array 455. As explained more completely below, each endless queue is a linked list of SCB array sites and there is no requirement that the SCB array sites be contiguous locations within memory 450.

Generally, all SCB array sites in an endless new SCB queue contain SCBs, except the tail SCB array site. The SCB array sites in an endless new SCB queue that contain a SCB are linked by the SCB site pointers stored in next queue site fields Q_NEXT of the SCBs. Although the tail new SCB array site does not contain a SCB, the storage location within the tail new SCB array site, that corresponds to the location of next queue site field Q_NEXT in a SCB, contains an invalid SCB site pointer value, which in this embodiment is 255, to identify that site as the tail of the endless new SCB queue. The invalid pointer in next queue site field Q_NEXT of the tail new SCB array site can be written only by the appending party, i.e., HIM 402. Thus, the one common register, e.g., storage location in a SCB array site within an endless new SCB queue, is accessible by both parties, but is writable by only one of the parties. This eliminates any timing windows with respect to reading and writing in an endless SCB queue.

Similarly, all SCB array sites in an endless done SCB queue typically contain SCBs, except the head SCB array site. The head SCB array site may include a completed SCB at some point when HIM 402 is proceeding to process more than one completed SCB in the endless done SCB queue. However, when HIM 402 has completed processing of the done SCBs, only next queue site field Q_NEXT in the head SCB array site is of interest, and so the head SCB array site is considered empty.

The SCB array sites in an endless done SCB queue that contain a SCB are linked by the SCB site pointers stored in next queue site fields Q_NEXT of the SCBs. Although the head done array site does not contain a SCB, the storage location within the head done SCB array site, that corresponds to the location of next queue site field Q_NEXT in a SCB, contains either an invalid pointer, or a valid SCB site pointer value to the next done SCB in endless done SCB queue.

In any case, the tail done SCB contains an invalid pointer in next queue site field Q_NEXT. The invalid pointer in field Q_NEXT of the tail done SCB can be written only by the appending sequencer. Thus, again the one common register, e.g., storage location in a SCB array site within an endless done SCB queue, is accessible by both parties but writable by only one of the parties. This eliminates any timing windows with respect to reading and writing in an endless SCB queue.

Endless New SCB Queue Management

Figure 5A:
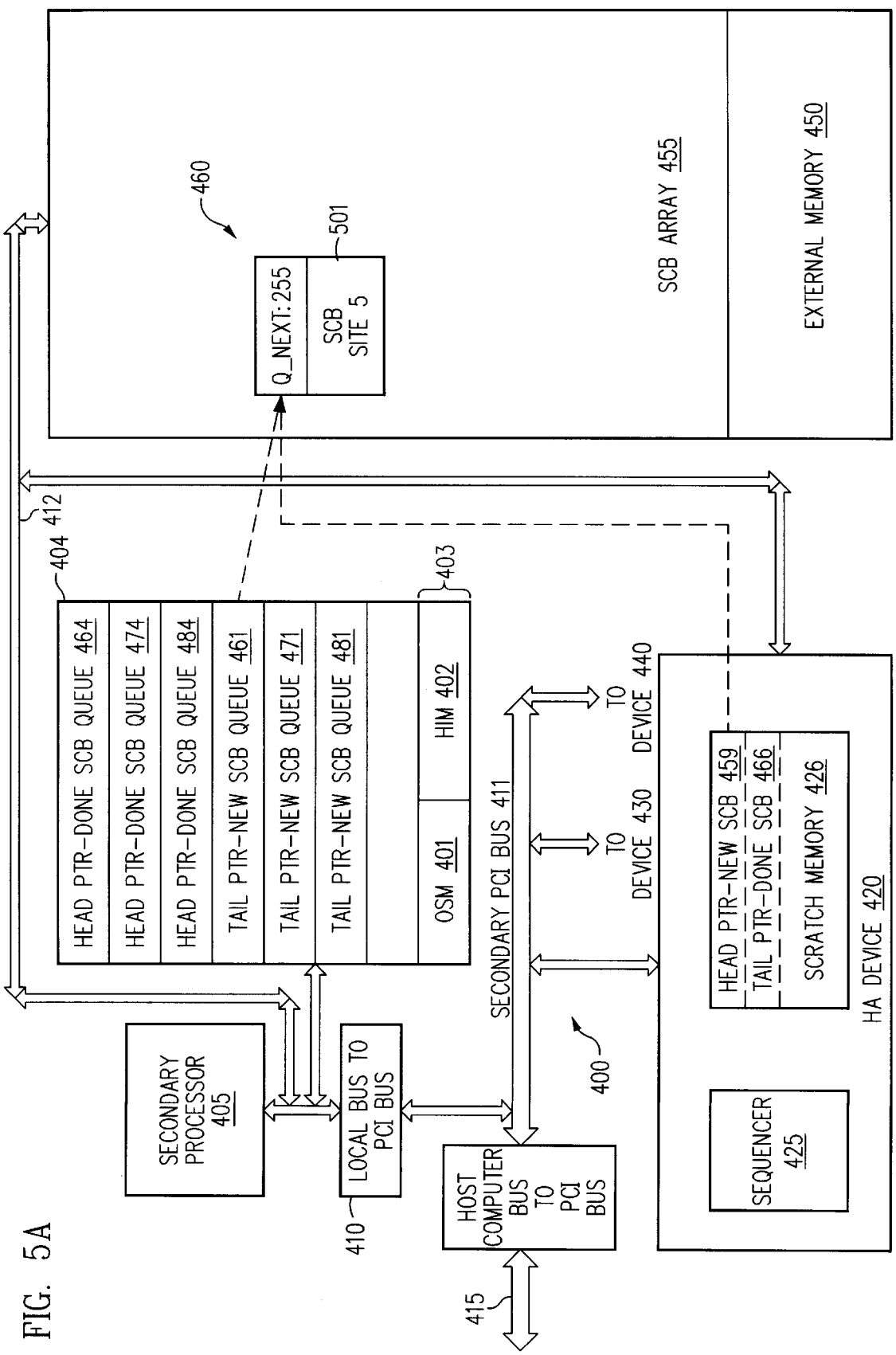
FIGS. 5A to 5D illustrate selected states of an endless new SCB queue when SCBs are added to that queue according to the principles of this invention.
Figure 6A:
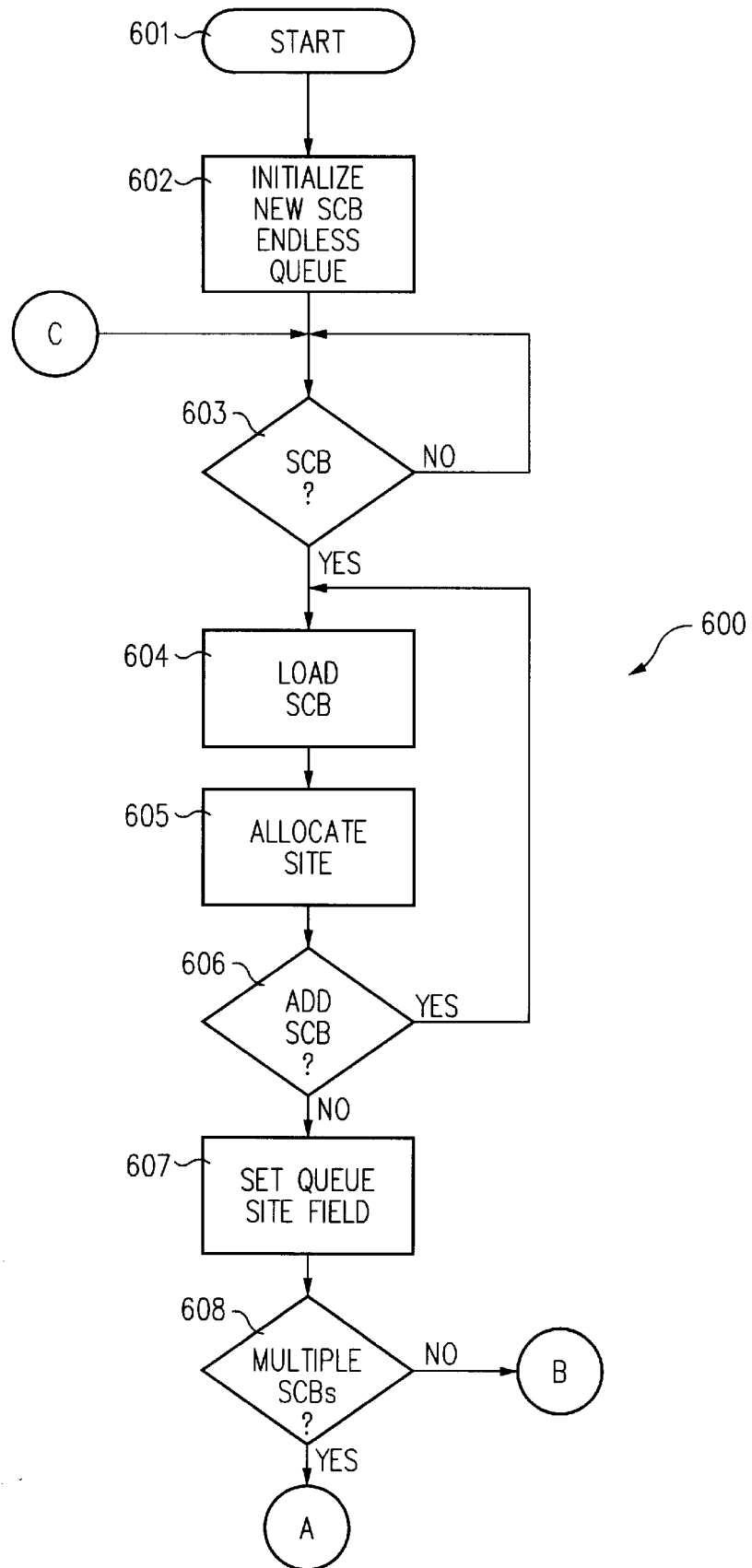
FIGS. 6A and 6B are a process flow diagram of one embodiment of the process of this invention for adding additional SCBs to an endless new SCB queue.
Figure 6B:
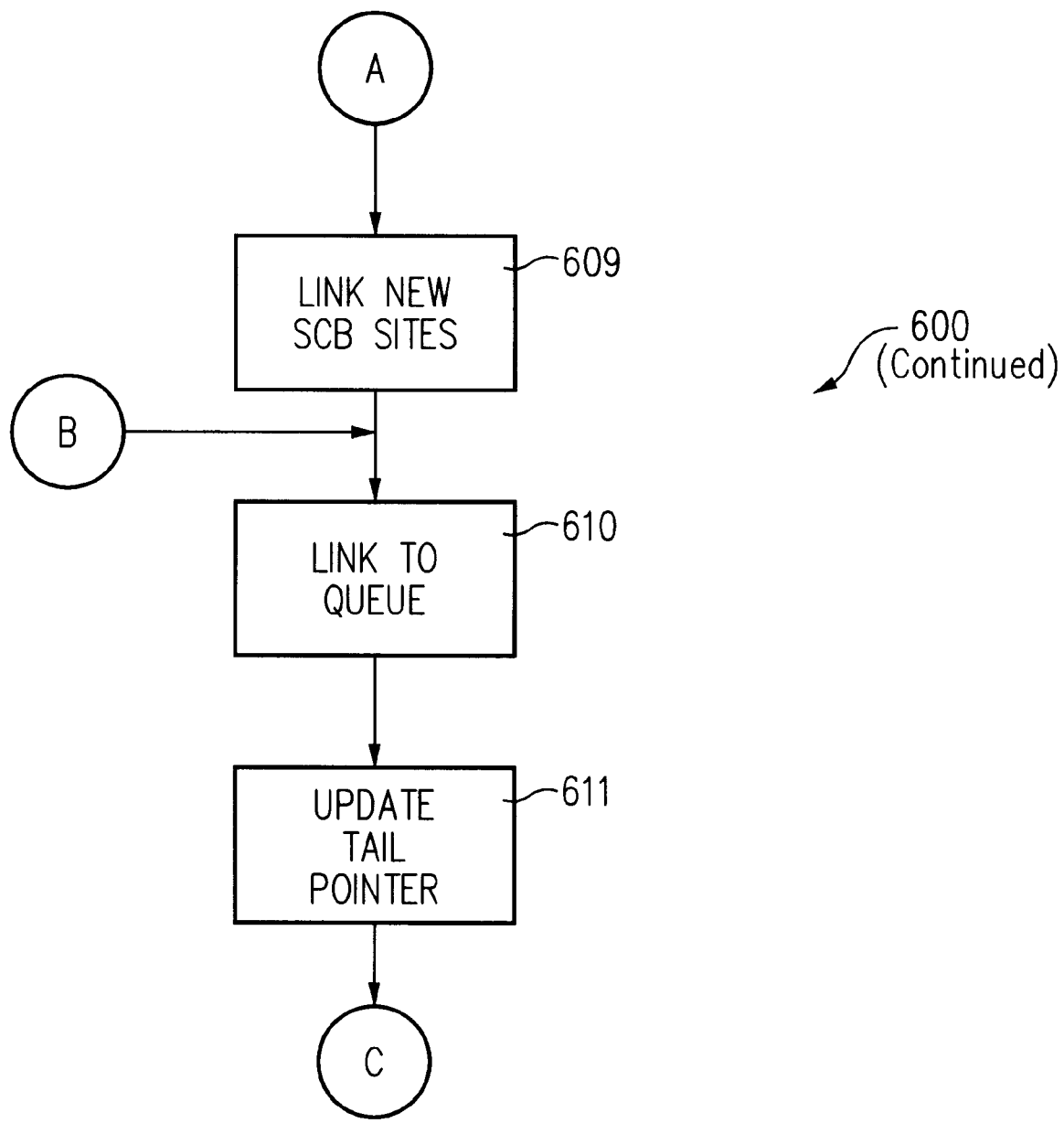
Figure 6C:
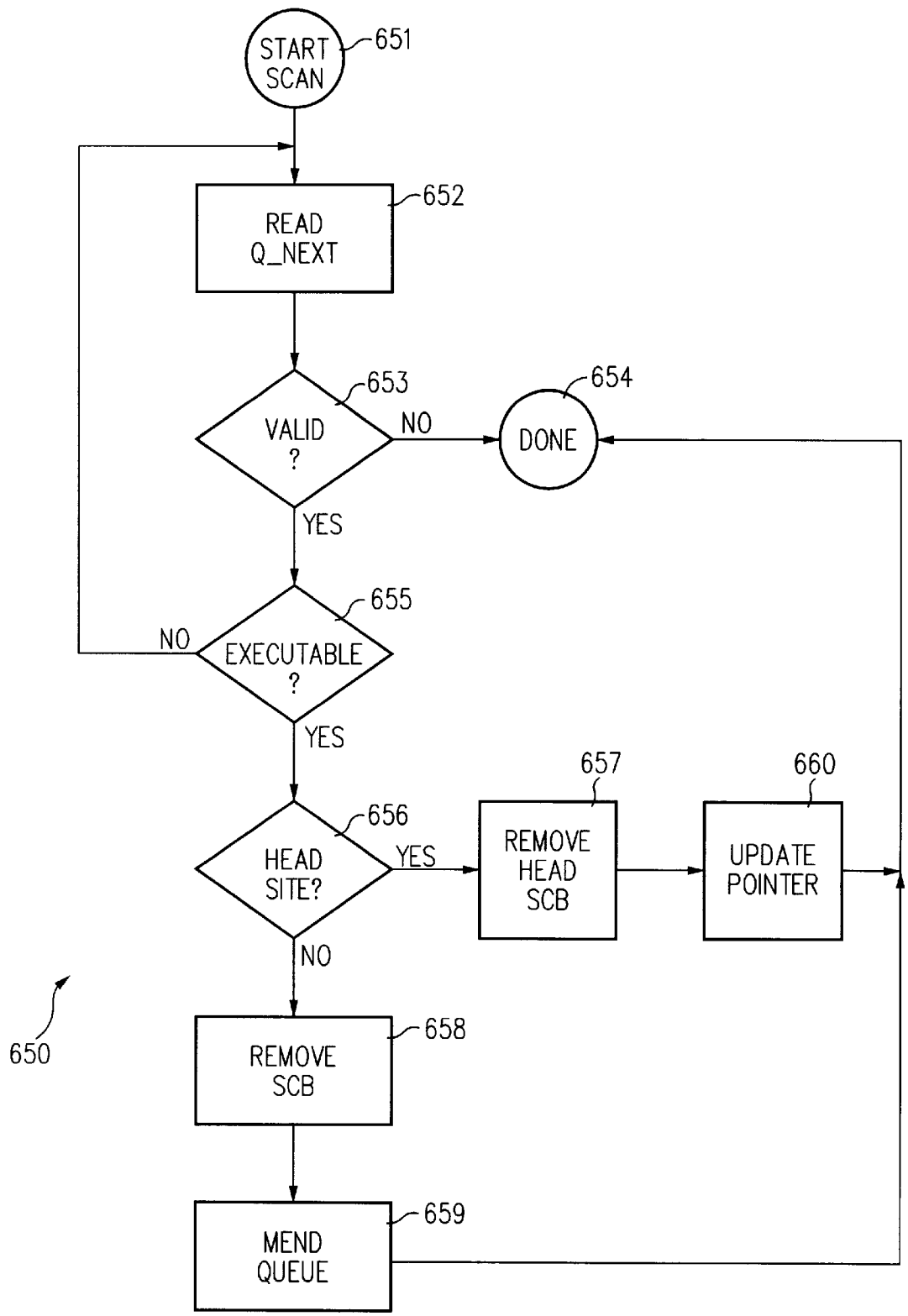
FIG. 6C is a process flow diagram of one embodiment of the process of this invention for removing SCBs from an endless new SCB queue.

As illustrated in FIG. 4, HIM 402 maintains a new SCB tail pointer 461 for endless new SCB queue 460, a new SCB tail pointer 471 for endless new SCB queue 470, and a new SCB tail pointer 481 for endless new SCB queue 480. None of new SCB tail pointers 461, 471, and 481 is accessible to sequencers 425, 435, and 445. For purposes of an example of endless new SCB queue management process 600 (FIG. 6), sequencer 425 and endless new SCB queue 460 with head new SCB site pointer 459 and tail new SCB site pointer 461 are used (FIGS. 4 and 5A). This example is directly applicable to any endless new SCB queue that is implemented according to the principles of this invention.

Upon start 601 of new SCB queue management process 600, HIM 402 allocates a SCB array site to endless new SCB queue 460 in initialize endless new SCB queue operation 602, even though HIM 402 has not yet built a SCB for execution. In this example, SCB array site five 501 (FIG. 5A) is allocated by HIM 402. HIM 402 loads field Q_NEXT in SCB array site five 501 with an invalid pointer, e.g., 255, to indicate that this site is the tail new SCB site of endless new SCB queue 460 and is empty.

In initialize endless new SCB queue operation 602, HIM 402 also loads tail new SCB site pointer 461 in memory 404 with 5 to indicate the tail new SCB site in SCB array 455 allocated to endless new SCB queue 460. HIM 402 also initializes head new SCB site pointer 459 in scratch memory 426 to 5 so that sequencer 425 can locate head new SCB site 501 of endless new SCB queue 460. This is the only time that HIM 402 accesses head new SCB site pointer 459 in scratch memory 426. Consequently, after initialize endless new SCB queue operation 602, only sequencer 425 can modify head new SCB site pointer 459.

Upon completion of operation 602, processing transfers to SCB check 603. HIM 402 remains in SCB check 603 until OSM 401 transfers information for a SCB or SCBs to HIM 402. Those of skill in the art will appreciate that sequencer 425 need not remain idle in check 603, and can leave process 600 and perform other tasks. Thus, check 603 is used to indicate HIM 402 does not proceed with process 600 until OSM 401 transfers information for a SCB or SCBs to HIM 402

While HIM is in check 603, if sequencer 425 retrieves head new SCB site pointer 459, head new SCB site pointer 459 directs sequencer 425 to SCB array site five 501. Sequencer 425 reads the invalid pointer value in field Q_NEXT of SCB array site five 501, and concludes that there is not a new SCB waiting for execution in endless new SCB queue 460.

Eventually, HIM 402 receives information for a new SCB or SCBs to be executed by sequencer 425, and builds, for example, two new SCBs. After the SCBs are built, new SCB queue management process 600 transfers processing from check 603 to load SCB operation 604. In load SCB operation 604, HIM 402 loads the first SCB into SCB array site five 501, but leaves the invalid pointer in field Q_NEXT of SCB array site five 501. The particular process, e.g., DMA or programmed I/O, used to physically load the SCB into memory 450 is not essential to the invention. Typically, the same physical process is used as in the prior art. If sequencer 425 scans endless new SCB queue 460 after SCB array site five 501 is loaded, sequencer 425 still does not recognize an executable SCB at SCB array site five 501 due to the invalid pointer value in field Q_NEXT.

Upon completion of load SCB operation 604, processing in HIM 402 transfers to allocate site operation 605. In operation 605, HIM 402 allocates SCB array site thirty-seven 502, i.e., allocates a new SCB site, and transfers to additional SCB check operation 606.

In additional SCB check operation 606, HIM 402 determines that there is another SCB for processing and so returns to load SCB operation 604. Load SCB operation 604 loads the second SCB into SCB array site thirty-seven 502. Even though endless new SCB queue 460 contains two executable SCBs, if sequencer 425 scans endless new SCB queue 460, sequencer 425 still does not recognize an executable SCB at SCB array site five 501 or at SCB array site thirty-seven 502 due to the invalid pointer value in SCB array site five 501.

Upon completion of load SCB operation 604, processing in HIM 402 again transfers to allocate site operation 605. In operation 605, HIM 402 allocates SCB array site one hundred two 503, and transfers to additional SCB check operation 606.

Figure 5B:
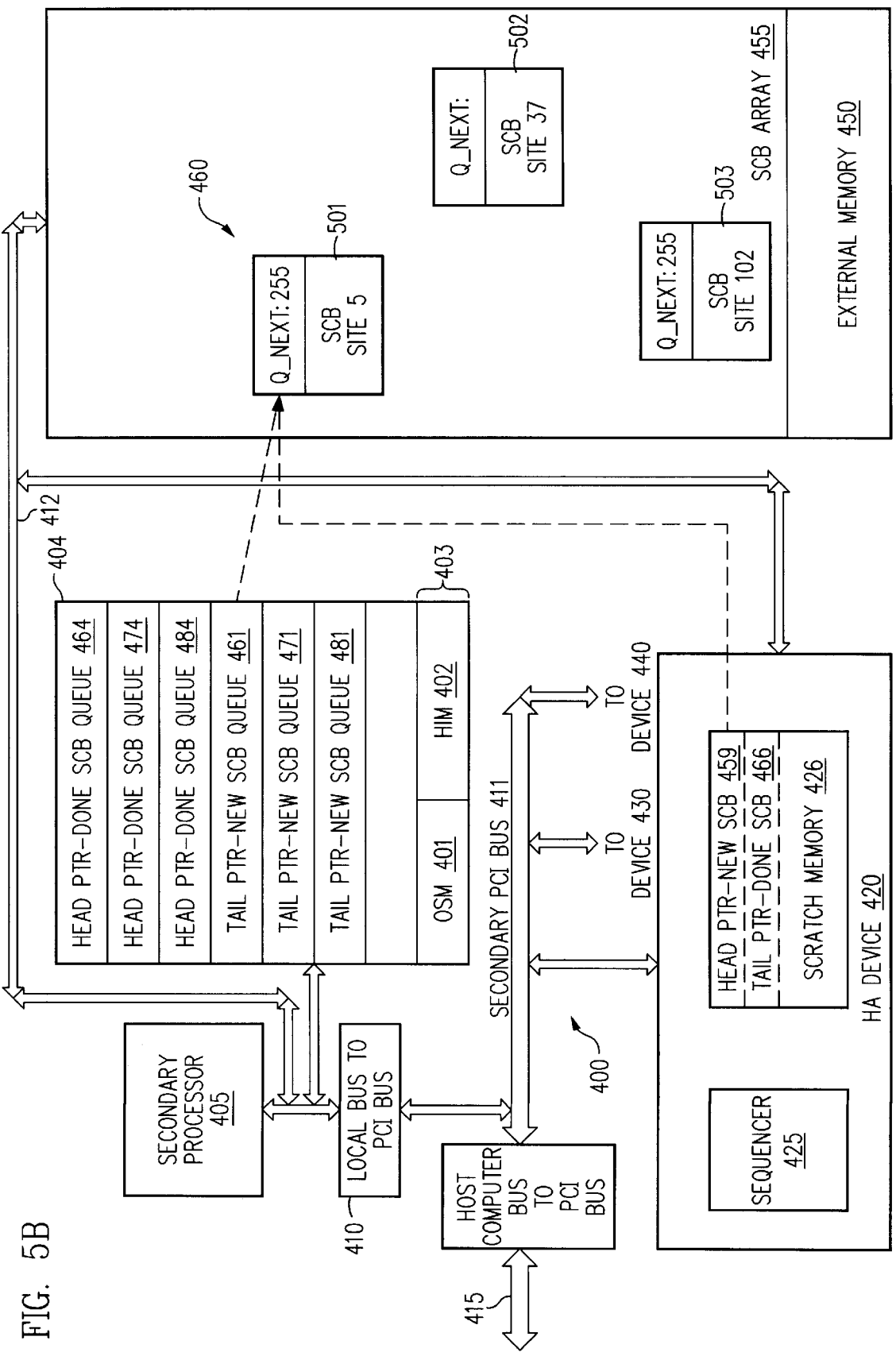

Since there are no additional SCBs at this point, check operation transfers processing to set queue site field operation 607. In operation 607, HIM 402 loads an invalid pointer into field Q_NEXT of SCB array site one hundred-two 503 (FIG. 5B).

Operation 607 transfers processing to multiple SCBs check operation 608. Check operation 608 determines whether more than one SCB has been loaded into SCB array 455. If more than one SCB has been loaded into SCB array 455, processing transfers to link new SCB sites operation 609, and otherwise to link to queue operation 610.

Figure 5C:
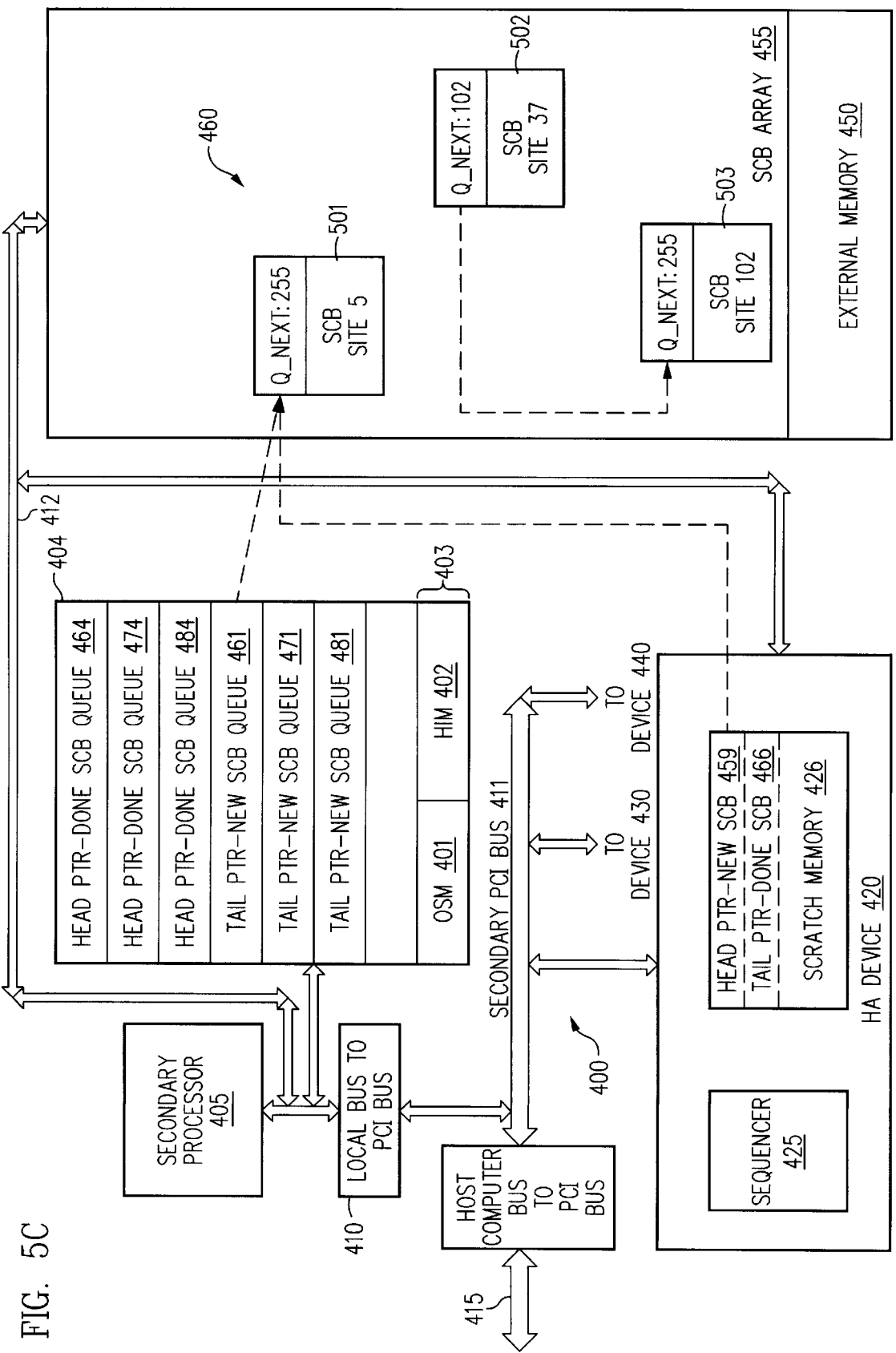

Since two SCBs have been loaded into SCB array 455, check operation 609 transfers to link new SCB sites operation 609. In operation 609, HIM 402 links tail new SCB site one hundred-two 503 to SCB site thirty-seven 502 by loading field Q_NEXT in SCB site thirty-seven 502 with a SCB site pointer of 102 (FIG. 5C). Thus, HIM 402 links the new SCBs together before appending the new SCBs to queue 460. Operation 609 transfers to link to queue operation 610.

Figure 5D:
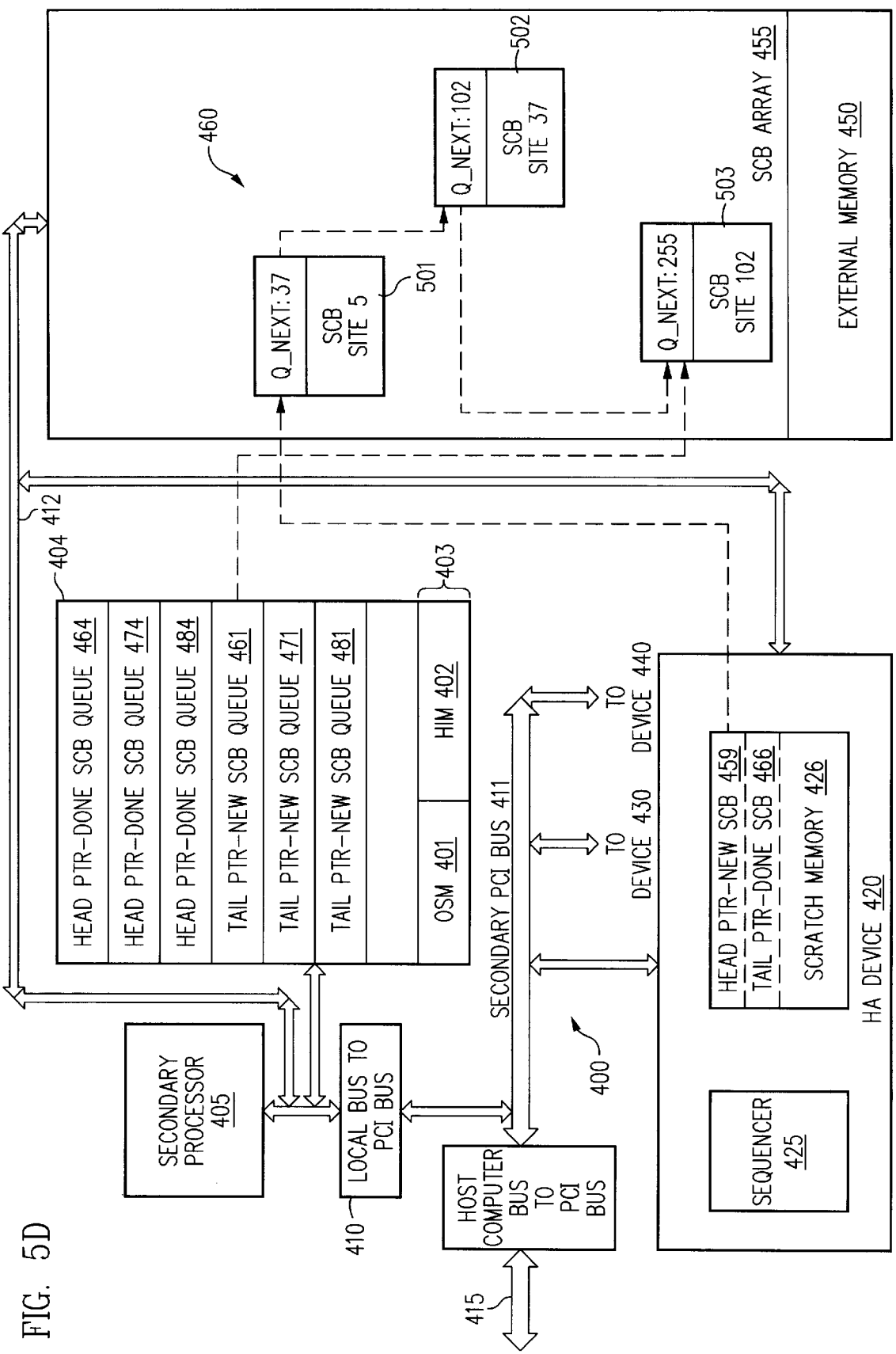

In link to queue operation 610, HIM 402 appends SCB site thirty-seven 502 and SCB site one hundred-two 503 to endless new SCB queue 460 by loading field Q_NEXT in SCB site five 501 with a SCB site pointer of 37. Thus, operation 610 links the new SCBs to queue 460. (FIG. 5D.) At this instant in time, the two new SCBs can be recognized by sequencer 425 as candidates for execution.

At some point in new SCB queue management process 600, HIM 402 must also update tail new SCB site pointer 461 to point to SCB site one hundred-two 503. Since sequencer 425 is unaware that endless new SCB queue 460 is being modified and in fact has no access to tail new SCB site pointer 461, it is unimportant when tail new SCB site pointer 461 is updated. In this embodiment, link to queue operation 610 transfers processing to update tail pointer operation 611. Update tail pointer operation 611 loads tail new SCB site pointer 461 with 102 to identify the tail new SCB site of endless new SCB queue 460 and transfers processing to SCB check 603.

Thus, in summary, to append a new SCB to endless new SCB queue 460, HIM 402 uses tail new SCB site pointer 461 to identify the end of endless new SCB queue 460. The new SCB is loaded into the tail new SCB site. The tail new SCB site still appears to be vacant to sequencer 425 until field Q_NEXT of the tail new SCB site is changed from the invalid pointer. After the SCB is loaded into the tail new SCB site, HIM 402 identifies another vacant array site to become the new queue tail new SCB site. HIM 402 loads an invalid pointer into field Q_NEXT of the new queue tail new SCB site. No other SCB bytes need to be defined at that site. Next, HIM 402 changes field Q_NEXT at the former tail SCB array site to point to the new tail SCB array site. At this point, the SCB at the former tail SCB array site becomes available to sequencer 425 for removal from endless new SCB queue 460. Finally, HIM 402 updates tail new SCB site pointer 461 to point to the new vacant SCB array site at the end of endless new SCB queue.

Thus, HIM 402 only changes field Q_NEXT of a tail new SCB site, and only changes field Q_NEXT from an invalid pointer to a valid pointer. There is no timing window within which sequencer 425 can read any field Q_NEXT in queue 460 and draw an incorrect conclusion. If sequencer 425 reads field Q_NEXT just before HIM 402 changes that field, sequencer 425 concludes that the end of queue 460 was found and there is no SCB to process at that site. However, sequencer 425 sees the new executable SCB in the next queue scan, so that no SCB is lost. If sequencer 425 reads field Q NEXT just after HIM 402 changes that field, sequencer 425 sees a valid pointer to the newly-appended queue tail, and concludes that the executable SCB, just added to the queue at the former tail SCB array site, can be removed Sequencer 425 maintains head new SCB site pointer 459 that is inaccessible to HIM 402 after initialization. Head new SCB site pointer 459 always identifies the beginning of endless new SCB queue 460. Sequencer 425 executes a process that initiates scanning of endless new SCB queue 460, in start scan operation 651. The scan for a SCB to begin executing starts at head new SCB site 501 (FIG. 5D) that is addressed by head new SCB site pointer 459. Specifically, sequencer 425 reads field Q_NEXT at SCB array site 501 in read Q_NEXT operation 652 and transfers processing to valid pointer check 653.

As described above, if field Q_NEXT at SCB array site 501 is a valid pointer, there is a new SCB in head SCB array site 501. Conversely, if this field Q_NEXT has an invalid pointer, queue 460 is empty. Thus, when check 653 finds a valid pointer, processing transfers from check 653 to executable check 655, and otherwise to done operation 654.

Executable check 655 determines whether the new SCB in site 501 can be executed at this time. The particular operations performed in executable check 655 are not essential to this invention, and are the same checks that would be performed by the prior art host adapter device. If the new SCB can be executed, check 655 transfers to head site check 556, and otherwise to read Q_NEXT operation 652.

Assuming that the new SCB at head site 501 is not currently executable by host adapter device 420, upon return to operation 652, sequencer 425 reads field Q_NEXT at SCB array site 502 because site 502 is address by the pointer in field Q_NEXT in head new SCB site 501. Operation 652 transfers processing to valid pointer check 653.

As described above, if field Q_NEXT at SCB array site 502 is a valid pointer, there is another new SCB in endless new SCB queue 460 array. Conversely, if this field Q_NEXT has an invalid pointer, queue 460 has only one new SCB. Thus, when check 653 finds a valid pointer, processing transfers from check 653 to executable check 655, and otherwise to done operation 654.

Executable check 655 determines whether the second new SCB can be executed at this time. If the second new SCB can be executed, check 655 transfers to head site check 556, and otherwise to read Q_NEXT operation 652. Operations 652, 653, and 654 are repeated until either an executable SCB is found or the tail new SCB site in endless new SCB queue 460 is reached.

Assuming that the second SCB in queue 460 is executable, check 655 transfers processing to head site check 656. Since the second SCB is not stored at head SCB array site 501, check 656 transfers processing to remove SCB operation 658 that identifies the SCB in the second SCB site of queue 460 as executable, and transfers to mend queue operation 659.

In mend queue operation 659, sequencer 425 moves the SCB site pointer in field Q_NEXT of the removed SCB, e.g., the value 102 at site 502, to field Q_NEXT of the SCB site pointing to the removed SCB, e.g., field Q_NEXT of SCB array site 501. Since the scan operation is completed, operation 659 transfers to done operation 654.

The previous example assumed that the SCB at site 501 was not executable at the time of that scan. Upon a subsequent initiation of process 650, operations 651 to 653 are performed identically to the above description, and check 653 transfers processing to executable check 655. If at this time the head SCB is executable, check 655 transfers processing to head site check 656 which in turn transfers processing to remove head SCB operation 657.

Remove head SCB operation 657 identifies the head SCB as executable and transfers processing to update pointer operation 660. In operation 660, sequencer 425 updates head new SCB site pointer 459 by moving the value in field Q_NEXT of the head new SCB site, e.g., value 102 in this example, to head new SCB site pointer 459. Operation 660 transfers processing to done operation 654.

Thus, sequencer 425 can remove SCBs from any array site in endless new SCB queue 460 except the last site, i.e., the tail SCB array site. If sequencer 425 removes the SCB at the head new SCB site, sequencer 425 updates head new SCB site pointer 459 by moving the value in field Q_NEXT of the head new SCB site to head new SCB site pointer 459. If sequencer 425 removes any other SCB, sequencer 425 simply mends queue 460 by moving the SCB site pointer in field Q_NEXT of the removed SCB to field Q_NEXT of the SCB site pointing to the removed SCB. The operations of sequencer 425 are not visible to HIM 402, and never leave queue 460 in an intermediate state as far as HIM 402 is concerned. Herein, sequencer 425 is described as performing certain operations and checks. Those of skill in the art will appreciate that these operations and checks are performed in response to a process executing on sequencer 425.

Endless Done SCB Queue Management

Figure 7A:
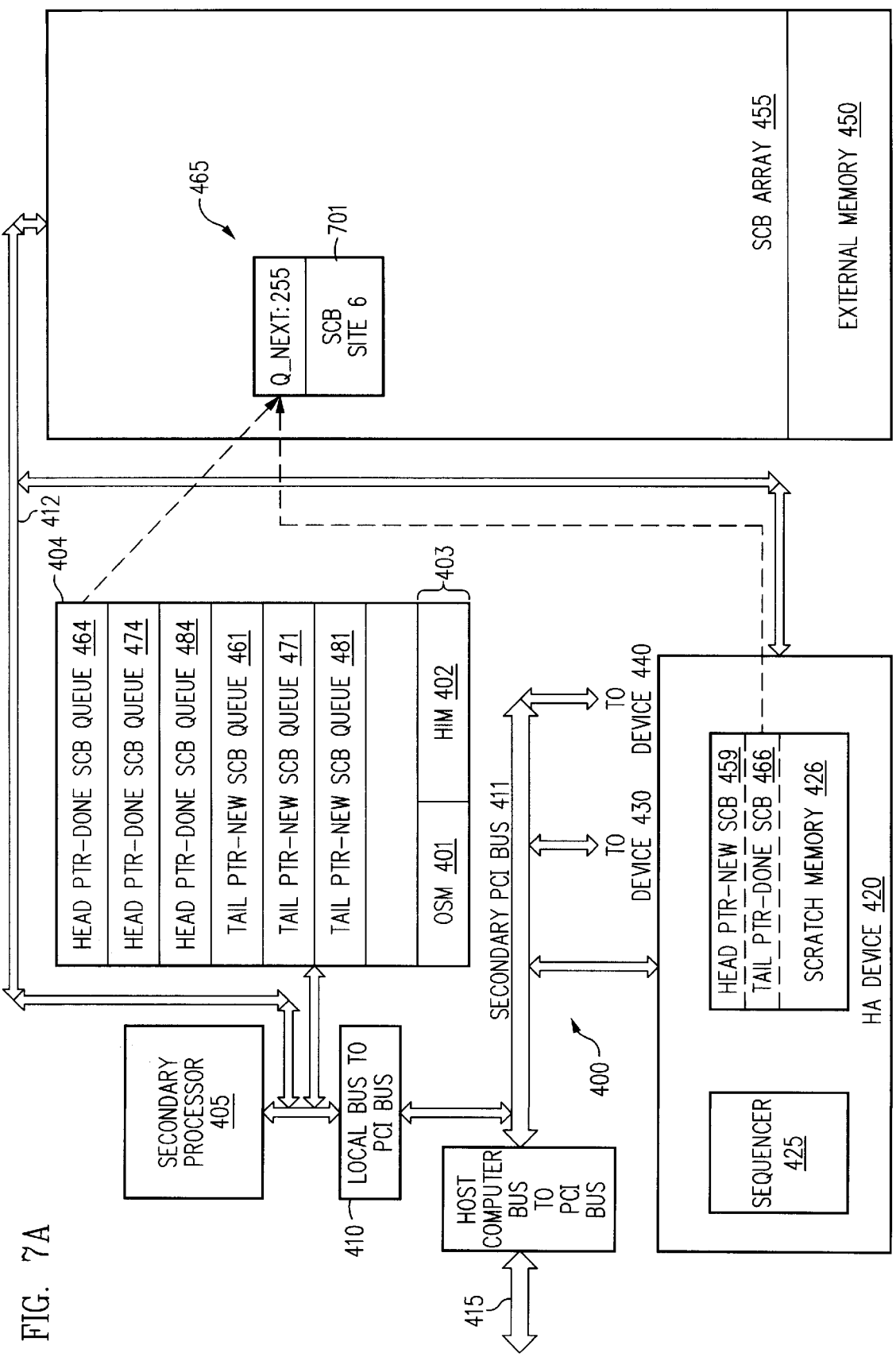
FIGS. 7A to 7D illustrate selected states of an endless done SCB queue when SCBs are added to that queue according to the principles of this invention.
Figure 8:
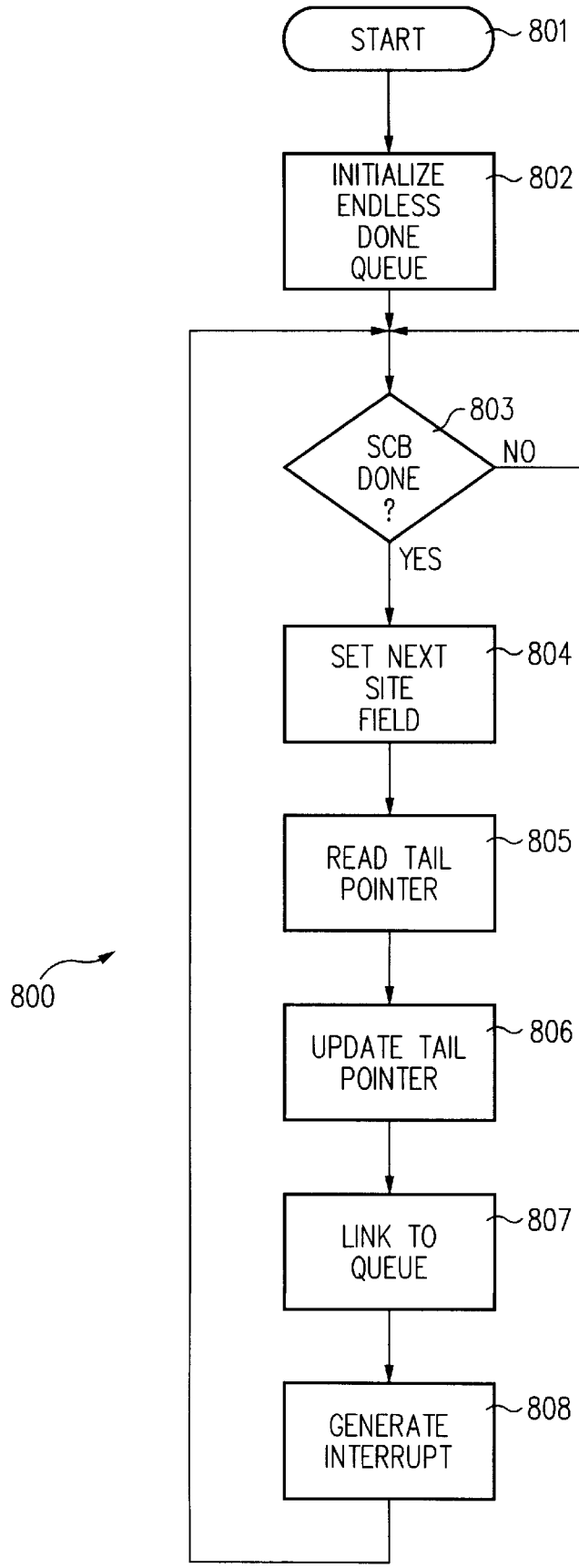
FIG. 8 is a process flow diagram of one embodiment of the process of this invention for adding additional SCBs to an endless done SCB queue.

As illustrated in FIG. 4, HIM 402 maintains a done SCB head pointer 464 for endless done SCB queue 465, a done SCB head pointer 474 for endless done SCB queue 475, and a done SCB head pointer 484 for endless done SCB queue 485. None of done SCB head pointers 464, 474, and 484 are accessible to sequencers 425, 435, and 445. For purposes of an example of endless done SCB queue management process 800 (FIG. 8), sequencer 425 and endless done SCB queue 465 with head done SCB site pointer 464 and tail done SCB site pointer 466 are used (FIGS. 4 and 7A). This example is directly applicable to any endless done SCB queue that is implemented according to the principles of this invention.

Upon start 801 of done SCB queue management process 800, HIM 402 allocates an arbitrary SCB array site to endless done SCB queue 465 in initialize endless done SCB queue operation 802, even though HIM 402 has not yet built a SCB for execution and so no SCB can be completed. Since HIM 402 builds each new SCB and assigns an array site in SCB array 455 for that new SCB, there is no possible conflict between the array sites chosen for new SCBs and the initial array sites that are assigned to each of endless done SCB queues 465, 475, and 485 in SCB array 455, i.e., one for each endless done queue. When an array site is utilized in an endless new SCB queue of this invention, the array site is marked as unavailable until HIM 402 determines, as explained more completely below, that all operations associated with a SCB at the array site are completed.

In this example, in initialize endless done SCB queue operation 802, SCB array site six 701 (FIG. 7A) is allocated by HIM 402 as the initial site in endless done queue 465. HIM 402 loads field Q_NEXT in SCB array site six 701 with an invalid pointer, e.g., 255, to indicate that this site is the tail done SCB array site of endless done SCB queue 465.

In initialize endless done SCB queue operation 802, HIM 402 also loads head done SCB site pointer 464 in memory 404 with six to indicate the head done SCB site in SCB array 455 is allocated to endless done SCB queue 465. HIM 402 also initializes tail done SCB site pointer 466 in scratch memory 426 to six so that sequencer 425 can locate tail done SCB site 701 of endless done SCB queue 465. This is the only time that HIM 402 accesses tail done SCB site pointer 466. Consequently, after initialize endless done SCB queue operation 802, only sequencer 425 can modify tail done SCB site pointer 466

Upon completion of operation 802, the remaining operations in process 800 are performed by sequencer 425 and sequencer 425 remains in SCB check 803 until sequencer 425 completes execution of a SCB. Those of skill in the art will appreciate that sequencer 425 does not remain idle in check 803, but rather leaves process 800 and performs other tasks. Thus, check 803 is used to indicate that when execution of the SCB is complete, sequencer 425 branches to set next queue site field operation 804. Thus, check 803 is used simply to indicate that the remaining operations in process 800 are not initiated until execution of a SCB by sequencer 425 is complete.

If at this time HIM 402 retrieves head done SCB site pointer 464, head done SCB site pointer 464 directs HIM 402 to SCB array site six 701. HIM 402 reads the invalid pointer value in field Q_NEXT of SCB array site six 701, and concludes that there is not an executed SCB in endless done SCB queue 465.

Figure 7B:
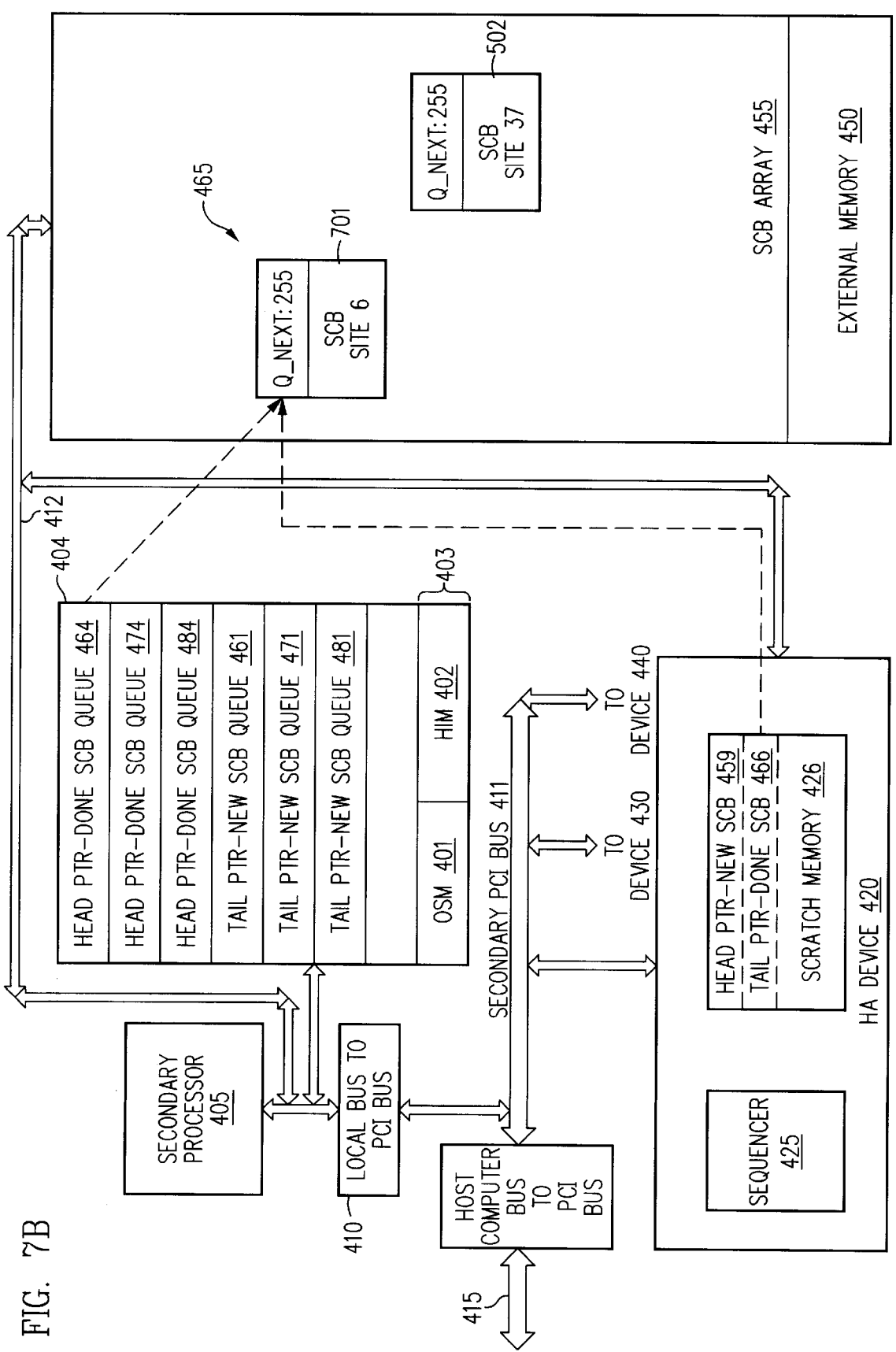

Eventually, sequencer 425 completes execution of a SCB, e.g., the SCB in SCB array site thirty-seven 502 and enters set next queue site field operation 804. In operation 804, sequencer 425 loads an invalid pointer into field Q_NEXT of SCB array site thirty-seven 502 (FIG. 7B). Operation 804 transfers to read tail pointer operation 805, that in turn reads, and saves tail done SCB site pointer 466 as previous tail done SCB pointer. Operation 805 transfers processing to update tail pointer 806.

Update tail pointer operation 806 loads tail done SCB site pointer 466 with a SCB site pointer, e.g., 37 to the newly completed SCB in SCB array site thirty-seven 502. Processing transfers from operation 806 to link to queue operation 807.

Figure 7C:
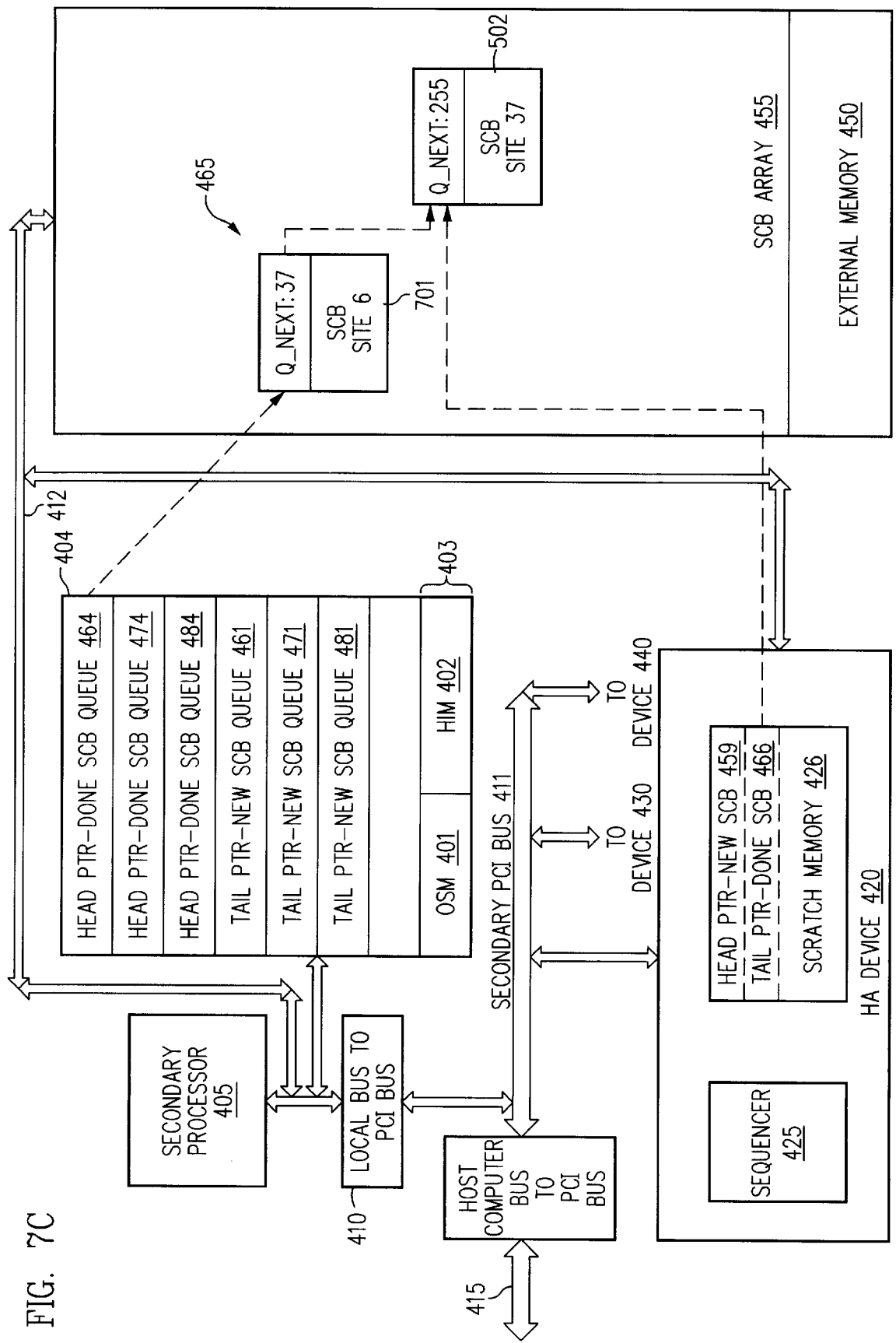

In link to queue operation 807, sequencer 425 uses the saved previous tail done SCB pointer to identify the previous tail SCB array site, and links SCB site thirty-seven 502 to the previous tail SCB array site of endless done SCB queue 465 by loading field Q_NEXT in SCB site six 701 with a SCB site pointer of 37. (FIG. 7C.) Finally, sequencer 425 interrupts microprocessor 405, to notify HIM 402 of the SCB added to queue 465.

Thus, in general according to the principles of this invention, only sequencer 425 writes an invalid pointer to field Q_NEXT of a new tail done SCB site, and changes field Q_NEXT of the previous tail done SCB site from an invalid pointer to a valid pointer only after the newly completed SCB is loaded in the new tail done SCB site. There is no timing window within which HIM 402 can read any field Q_NEXT in queue 465 and draw an incorrect conclusion.

If, in this example, HIM 402 were to read field Q_NEXT in SCB site six 701 just before sequencer 425 changed that field, HIM 402 would conclude that the end of queue 465 was found and there was no completed SCB to process at that site. However, HIM 402 sees the newly completed SCB in the next queue scan, so that no SCB is lost. If HIM 402 reads field Q_NEXT just after sequencer 425 changes that field, HIM 402 sees a valid pointer to the newly-appended completed SCB, and concludes that queue 465 includes at least one completed SCB.

Specifically, HIM 402 becomes aware that one or more SCBs have been appended to endless done SCB queue 465, probably via the interrupt generated by sequencer 425, or perhaps as the result of another interrupt. HIM 402 checks field Q_NEXT of the SCB array site addressed by head done SCB site pointer 464, in this example, SCB array site six 701.

At this time, field Q_NEXT of SCB array site six 701 contains a valid pointer. The valid pointer tells HIM 401 that there is at least one SCB to remove from endless done SCB queue 465.

Figure 7D:
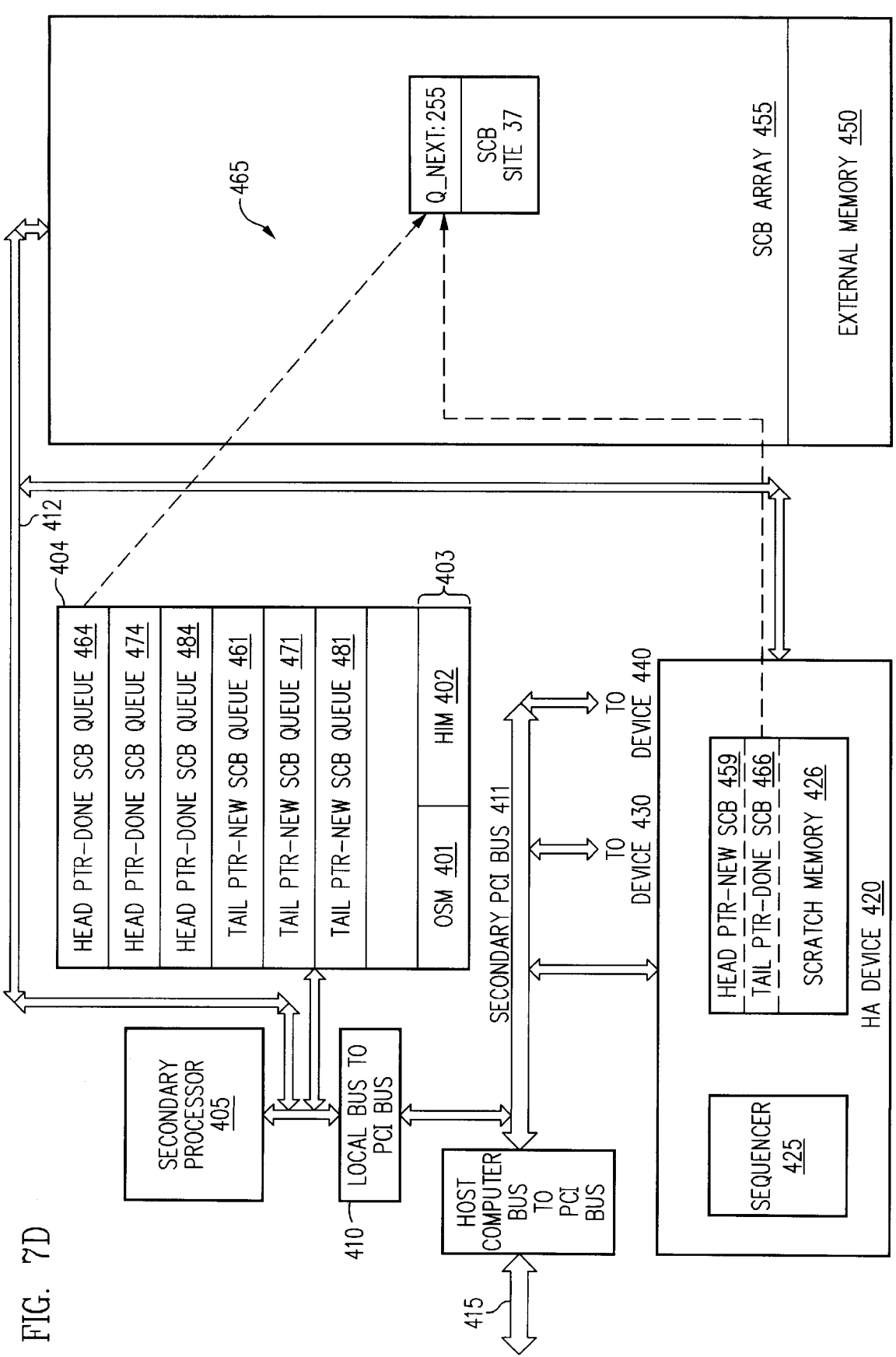

Thus, HIM 402 copies the value in field Q_NEXT of SCB array site six 701 to head done SCB pointer 464 and deallocates SCB array site six 701. This makes site 701 available for an endless new SCB queue. HIM 402 uses the SCB site pointer in field Q_NEXT of SCB array site six 701 to identify SCB array site thirty-seven 502 as the next completed SCB in endless done SCB queue 465. (FIG. 7D) HIM 402 posts the SCB in array site thirty-seven 502 back to its caller as completed, and looks at field Q_NEXT in SCB array site thirty-seven 502. Since field Q_NEXT is an invalid pointer, HIM 402 identifies this site as the tail SCB array site of queue 465, and takes no further action with respect to endless done SCB queue 465 at this time. HIM 402 does not deallocate SCB site thirty-seven 502 so that the next completed SCB can be appended to the site. This makes the queue endless. Thus, HIM 402 insures that sequencer 425 never sees an empty endless done SCB queue 465. Sequencer 425, therefore, always sees a SCB array site in endless done queue 465 to which sequencer 425 can link another completed SCB.

Notice that if necessary, sequencer 425 could add several completed SCBs to endless done SCB queue 465 by modifying process 800 to include operations similar to those in process 600 that were used in processing multiple new SCBs, except the operations performed by each party are reversed.

The methods of this invention are particularly useful for systems that have a connection to an external memory, between the microprocessor and the devices on an I/O bus for delivering SCBs, that is independent of the I/O bus. Frequent polling of the queue tail SCB array site by a sequencer for a new SCB via an independent delivery connection removes traffic from the I/O bus and so enhances data transfer rates over the I/O bus. This method is also particularly well-suited for a system that has no convenient means, other than the endless queue, for the device driver to notify the sequencer that the endless queue contains a new SCB.

While the principles of this invention have been described with reference to one particular system, e.g., system 400, those of skill in the art will appreciate that the endless queues and the management of those queues can be used to advantage in a wide variety of systems. For example, a system similar to that illustrated in FIG. 4 could be used as a bridge between a SCSI bus and a plurality of other SCSI buses. In this case, the host computer bus of FIG. 4 is a SCSI bus.

I claim:

1. A method for management of hardware command blocks in a system having a system processor coupled to a plurality of devices by a bus, said method comprising:

addressing a head hardware command block storage site of an endless hardware command block queue using only a head hardware command block pointer wherein said head hardware command block pointer is changed only by a first party; and addressing a tail hardware command block storage site of said endless hardware command block queue using only a tail hardware command block pointer wherein said tail hardware command block pointer is changed only by a second party different from said first party; and further wherein said first party is one of (I) a process executing on a device processor of one device in said plurality of devices and (ii) a device driver executing on said system processor;

said second party is the other of said process executing on said device processor and said device driver; and said endless hardware command block queue is maintained to never be empty and so has at least one storage site allocated to said endless hardware command block queue following an initialization.

2. A method for management of hardware command blocks in a system having a system processor coupled to a plurality of devices by a bus, as in claim 1 wherein said endless hardware command block queue is an endless new hardware command block queue; said first party is said process executing on said device processor of one device in said plurality of devices; and said second party is said device driver.

3. A method for management of hardware command blocks in a system having a system processor coupled to a plurality of devices by a bus, as in claim 2 further comprising:

scanning said endless new hardware command block queue by said process executing on said device processor of one device in said plurality of devices to determine whether said endless new hardware command block contains a hardware command block that can be executed.

4. A method for management of hardware command blocks in a system having a system processor coupled to a plurality of devices by a bus as in claim 3, wherein said method further comprises:

leaving said head hardware command block pointer unchanged by said process executing on said device processor of one device when (i) said endless new hardware command block queue contains a hardware command block that can be executed, and (ii) said hardware command block that can be executed is stored in a hardware command block storage site in said endless new hardware command block queue other than said hardware command block storage site pointed to by said head hardware command block pointer.

5. A method for management of hardware command blocks in a system having a system processor coupled to a plurality of devices by a bus as in claim 3, wherein said method further comprises:

removing a hardware command block, that can be executed and that is stored in a site other than said hardware command block site addressed by said head hardware command block pointer, from said endless new hardware command block queue for execution.

6. A method for management of hardware command blocks in a system having a system processor coupled to a plurality of devices by a bus as in claim 5 wherein said method, further comprises:

mending said endless new hardware command block queue.

7. A method for management of hardware command blocks in a system having a system processor coupled to a plurality of devices by a bus as in claim 3, wherein said method further comprises:

removing a hardware command block that can be executed from said hardware command block site addressed by said head hardware command block pointer from said endless new hardware command block queue for execution.

8. A method for management of hardware command blocks in a system having a system processor coupled to a plurality of devices by a bus as in claim 3, wherein said method further comprises:

updating said head hardware command block pointer by said process executing on said device processor of one device when (i) said endless new hardware command block queue contains a hardware command block that can be executed, and (ii) said hardware command block that can be executed is stored in a site pointed to by said head hardware command block pointer.

9. A method for management of hardware command blocks in a system having a system processor coupled to a plurality of devices by a bus as in claim 2 wherein said method further comprises:

initializing said endless new hardware command block queue by said device driver.

10. A method for management of hardware command blocks in a system having a system processor coupled to a plurality of devices by a bus, as in claim 9 wherein said initializing operation includes:

loading a head hardware command block pointer in a memory addressable by said device processor with a pointer to an initial hardware command block storage site in said endless new hardware command block queue.

11. A method for management of hardware command blocks in a system having a system processor coupled to a plurality of devices by a bus, as in claim 10 wherein said initializing operation includes:

loading a tail hardware command block pointer in a memory of said system processor with a pointer to said initial hardware command block storage site in said endless new hardware command block queue.

12. A method for management of hardware command blocks in a system having a system processor coupled to a plurality of devices by a bus, as in claim 9 wherein said initializing operation includes:

setting a next queue site field in an initial hardware command block storage site to an invalid pointer.

13. A method for management of hardware command blocks in a system having a system processor coupled to a plurality of devices by a bus as in claim 2, said method further comprising:

loading a new hardware command block in a tail hardware command block storage site of said endless new hardware command block queue without changing a next queue site field of said tail hardware command block storage site.

14. A method for management of hardware command blocks in a system having a system processor coupled to a plurality of devices by a bus as in claim 13, said method further comprising:

allocating a new hardware command block storage site for said endless new hardware command block queue by said device driver.

15. A method for management of hardware command blocks in a system having a system processor coupled to a plurality of devices by a bus as in claim 14, said method further comprising:

setting a next queue site field, in said new hardware command block storage site for said endless new hardware command block queue, to an invalid pointer by said device driver.

16. A method for management of hardware command blocks in a system having a system processor coupled to a plurality of devices by a bus as in claim 15, said method further comprising:

setting, by said device driver, next queue site field of said tail hardware command block storage site to point to said new hardware command block storage site.

17. A method for management of hardware command blocks in a system having a system processor coupled to a plurality of devices by a bus as in claim 16, said method further comprising:

updating said tail hardware command block pointer, by said device driver, to point to said new hardware command block storage site so that said new hardware command block storage site becomes the tail hardware command block storage site of said endless new hardware command block queue.

18. A method for management of hardware command blocks in a system having a system processor coupled to a plurality of devices by a bus, as in claim 1 wherein said endless hardware command block queue is an endless done hardware command block queue; said first party is said device driver; and said second party is said process executing on said device processor of one device in said plurality of device.

19. A method for management of hardware command blocks in a system having a system processor coupled to a plurality of devices by a bus as in claim 18, wherein said method further comprises:

reading, by said device driver, a next site queue field in said hardware command block storage site addressed by said head hardware command block pointer to determine whether said next site queue field contains a valid pointer.

20. A method for management of hardware command blocks in a system having a system processor coupled to a plurality of devices by a bus as in claim 19, wherein said method further comprises:

copying, by said device driver, the value in said next site queue field to said head hardware command block pointer upon determining that said next site queue field contains a valid pointer.

21. A method for management of hardware command blocks in a system having a system processor coupled to a plurality of devices by a bus as in claim 20, wherein said method further comprises:

deallocating, by said device driver, the hardware command block storage site previously addressed by said head hardware command block pointer.

22. A method for management of hardware command blocks in a system having a system processor coupled to a plurality of devices by a bus as in claim 20, wherein said method further comprises:

posting, by said device driver, the hardware command block in the hardware command block storage site pointed to by the value in said next site queue field as completed upon determining that said next site queue field contains a valid pointer.

23. A method for management of hardware command blocks in a system having a system processor coupled to a plurality of devices by a bus as in claim 18 wherein said method further comprises:

initializing said endless done hardware command block queue by said device driver.

24. A method for management of hardware command blocks in a system having a system processor coupled to a plurality of devices by a bus, as in claim 23 wherein said initializing operation includes:

loading a head hardware command block pointer in a memory of said system processor with a pointer to an initial hardware command block storage site in said endless done hardware command block queue.

25. A method for management of hardware command blocks in a system having a system processor coupled to a plurality of devices by a bus as in claim 23 wherein said initializing operation includes:

loading a tail hardware command block pointer in a memory addressable by said device processor with a pointer to an initial hardware command block storage site in said endless hardware command block queue.

26. A method for management of hardware command blocks in a system having a system processor coupled to a plurality of devices by a bus as in claim 23 wherein said initializing operation includes:

setting a next queue site field in an initial hardware command block storage site to an invalid pointer.

27. A method for management of hardware command blocks in a system having a system processor coupled to a plurality of devices by a bus as in claim 18, said method further comprising:

setting, by said process executing on said device processor, a next queue site field in a newly complete hardware command block to an invalid pointer value.

28. A method for management of hardware command blocks in a system having a system processor coupled to a plurality of devices by a bus as in claim 27, said method further comprising:

reading, by said process executing on said device processor, said tail hardware command block site pointer for said endless done hardware command block queue.

29. A method for management of hardware command blocks in a system having a system processor coupled to a plurality of devices by a bus as in claim 28, said method further comprising:

updating, by said process executing on said device processor, said tail hardware command block site pointer to address said newly completed hardware command block.

30. A method for management of hardware command blocks in a system having a system processor coupled to a plurality of devices by a bus as in claim 15, said method further comprising:

setting, by said process executing on said device processor, said next queue site field of said previous tail hardware command block storage site to point to said new tail hardware command block storage site.

31. A method for managing hardware command blocks for a plurality of devices where each device includes a device processor:

forming an endless queue for a device in a memory external to said device, wherein following formation, said endless queue is maintained to have at least one storage site always allocated to said endless queue and so said endless queue is never empty;

maintaining a first pointer to said endless queue in a memory that is not within the memory space of said device processor; and maintaining a second pointer to said endless queue in a memory of said device processor, wherein said second pointer is used only by said device processor in accessing said endless queue.

* * * * *